US006943703B2

(12) United States Patent
Rubenstein

(10) Patent No.: US 6,943,703 B2
(45) Date of Patent: Sep. 13, 2005

(54) APPARATUS FOR COMMUNICATING WITH LAW ENFORCEMENT DURING VEHICLE TRAVEL AND ASSOCIATED METHODS

(75) Inventor: Jeff Rubenstein, Boca Raton, FL (US)

(73) Assignee: Advanced Public Safety, Inc., Boca Raton, FL (US)

(*) Notice: Subject to any disclaimer, the term of this patent is extended or adjusted under 35 U.S.C. 154(b) by 40 days.

(21) Appl. No.: 10/656,487

(22) Filed: Sep. 5, 2003

(65) Prior Publication Data

US 2004/0066305 A1 Apr. 8, 2004

Related U.S. Application Data

(63) Continuation of application No. 09/968,633, filed on Oct. 1, 2001, now Pat. No. 6,621,422.

(51) Int. Cl.[7] .......... G08G 1/123

(52) U.S. Cl. .......... 340/988; 340/692; 340/995; 340/996; 707/10

(58) Field of Search .......... 340/988, 692, 340/995, 996, 902, 933, 995.1, 995.12; 707/1, 2, 10, 24

(56) References Cited

U.S. PATENT DOCUMENTS

| | | | | | |
|---|---|---|---|---|---|
| 3,899,772 | A | | 8/1975 | Mead et al. | 340/152 |
| 4,083,003 | A | * | 4/1978 | Haemmig | 325/6 |
| 4,152,693 | A | * | 5/1979 | Ashworth, Jr. | 340/24 |
| 4,354,252 | A | | 10/1982 | Lamb et al. | 364/900 |
| 5,263,118 | A | | 11/1993 | Cornelison | 395/2 |
| 5,731,785 | A | * | 3/1998 | Lemelson et al. | 342/357 |
| 5,969,704 | A | | 10/1999 | Green et al. | 345/113 |
| 6,035,016 | A | | 3/2000 | Moore | 379/45 |
| 6,049,272 | A | | 4/2000 | Lee et al. | 340/539 |
| 6,078,282 | A | * | 6/2000 | Casey | 342/357.06 |
| 6,161,066 | A | | 12/2000 | Wright et al. | 701/36 |
| 6,173,284 | B1 | * | 1/2001 | Brown | 707/10 |
| 6,188,939 | B1 | | 2/2001 | Morgan et al. | 701/36 |
| 6,317,684 | B1 | * | 11/2001 | Roeseler et al. | 701/202 |
| 6,393,360 | B1 | * | 5/2002 | Ma | 701/208 |
| 6,408,304 | B1 | * | 6/2002 | Kumhyr | 707/102 |
| 6,621,422 | B2 | * | 9/2003 | Rubenstein | 340/988 |

OTHER PUBLICATIONS

POS Periphera, Point of Sale & Bar Code Super Store, [retrieved on Aug. 28, 2001]. Retrieved from the Internet: <http://www.posperipherals.com/eptmu5serdot.html>.

ScanSoft, eOmniForm.com, [retrieved on Aug. 28, 2001]. Retrieved from the Internet: <http://www.caere.com/products/omniform/eomniform.asp>.

Motorola; "Mobile Data Solutions; Provides timely in–vehicle access to information about people, property and vehicles; Premier MDC Software".

* cited by examiner

*Primary Examiner*—Toan N. Pham
(74) *Attorney, Agent, or Firm*—Bracewell & Giuliani LLP

(57) ABSTRACT

An apparatus for communicating with law enforcement during vehicle travel and associated methods are provided. The apparatus preferably includes a department server in communication with a vehicle computer and also in communication with a plurality of law enforcement databases. The vehicle computer includes mobile data communications software and officer communications enhancing software. The officer communications enhancing software preferably includes one or more of an audio communicator to transmit enhanced audio law enforcement data received from the mobile data communications software to the officer, an incident form completing enhancer to generate and populate incident forms, and a quick mapper to quickly generate and display a site overview map such as a top plan street view to an officer.

17 Claims, 24 Drawing Sheets

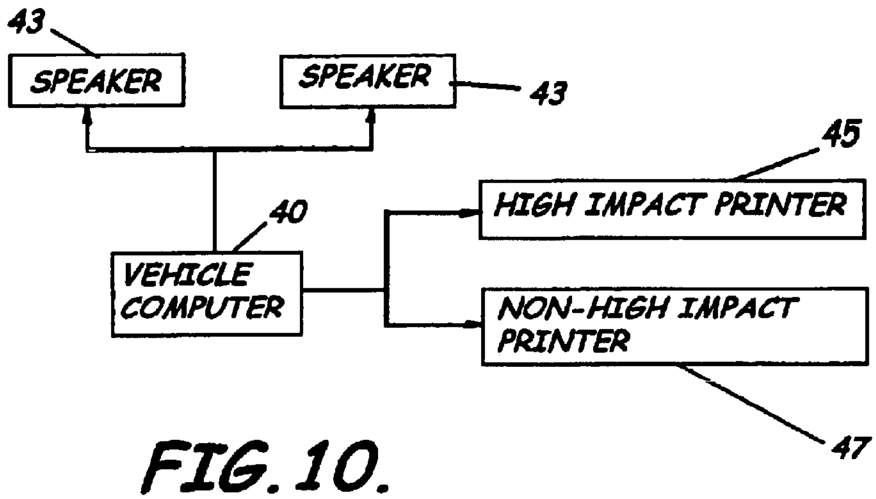
FIG. 10.
FIG. 11.
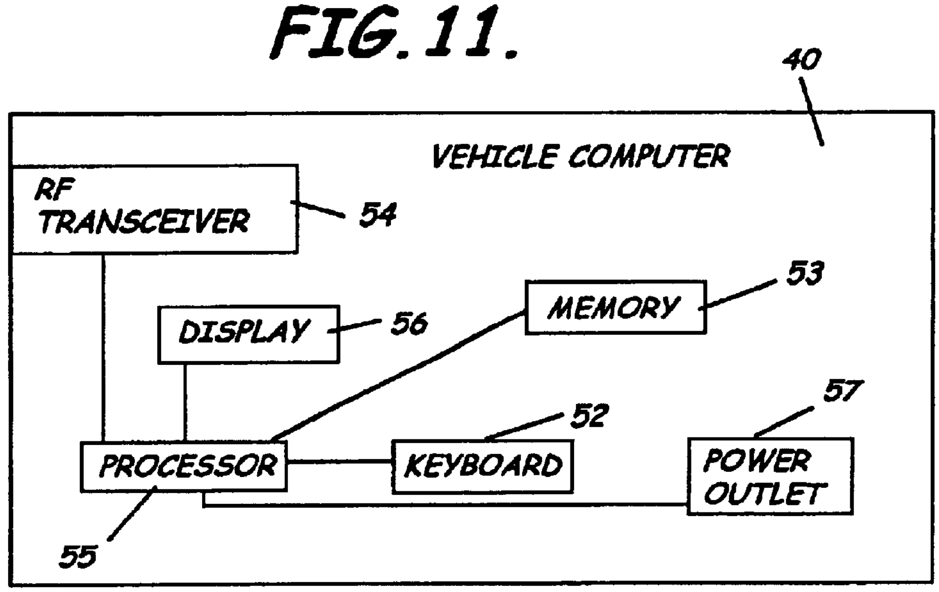
FIG. 12.
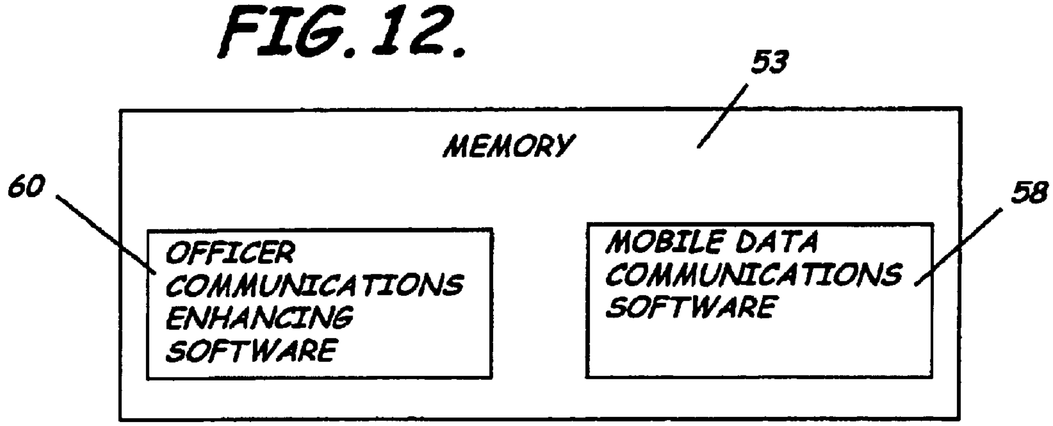

APPARATUS FOR COMMUNICATING WITH LAW ENFORCEMENT DURING VEHICLE TRAVEL AND ASSOCIATED METHODS

CROSS REFERENCE TO RELATED APPLICATIONS

This application is a continuation of U.S. patent application Ser. No. 09/968,633, filed on Oct. 1, 2001, now U.S. Pat. No. 6,621,422 issued on Sep. 16, 2003.

FIELD OF THE INVENTION

The present invention relates to the field of communications software generally and, more particularly, to wireless communication software for vehicle computers and associated methods.

BACKGROUND OF THE INVENTION

Law enforcement officers have long needed a cost-effective system which delivers law enforcement data quickly, helps officers save time in the performance of their duties, and accomplishes these goals without interfering with other officer duties or endangering the officer. Early officer data systems included human dispatchers in radio frequency ("RF") communication with officers in vehicles. In these early systems, data requested by the officer was typically searched for by hand and read back to the officer over the radio and, therefore, suffered from slow delivery of data, the cost associated with employing dispatchers, and a very limited database of available data.

These early systems were gradually replaced by police department computer systems typically including a main computer in a police department headquarters or control center in communication with a police vehicle computer and at least one law enforcement database, such as the system shown in U.S. Pat. No. 6,188,939, by Morgan et al. titled "*Advanced Law Enforcement and Response Technology*". Systems of this type use a handheld input device having a magnet stripe reader for filling in forms with data held on a magnet stripe located on cards such as driver's licenses, transmitting these forms to the vehicle computer, and printing out these forms on a printer positioned in the vehicle. The magnet stripe reader for reading driver's licenses poses an additional problem because the data obtained from the magnet stripe is often out of date, especially in states where licenses need not be renewed, and hence bar codes not being updated for many years. Further, the handheld unit required by such systems prevents the officer's hands from being free for other activities and can place the officer in dangerous situations such as when the officer's attention is devoted to the handheld unit instead of the officer's surroundings.

Systems such as the Premiere MDC system sold by Motorola Corporation of Straumberg, Ill. have a police department computer in communication with a police vehicle computer and a database of law enforcement data. These systems offer computer aided dispatching, computer generated reports to be filled out by the officer, and can transmit responses to officer requests for law enforcement data such as data associated with license plate numbers or driver's licenses. The vehicle computer software in the Motorola system has a limited text-to-voice program for presenting data in audio rather than video format and is also capable of displaying maps using a global positioning system ("GPS") unit to define the area to be displayed. The presentation of this data, however, is often poorly organized and poorly prioritized, thereby requiring the officer to spend a long time finding the desired data and distracting the officer from other work. The text-to-voice software from the Motorola system allows the officer to be somewhat more aware of the surroundings but still endangers the officer as critical data, such as whether a suspect is believed to be dangerous, may not come until the middle or end of the audio transmission. Such systems conventionally transfer each element of written data or text to voice, e.g., including zip codes, extraneous information. Much of this information, however, is not needed by the officer and can be information overload for an officer. Further, because text-to-voice is typically monotone or lacking intonation, the officer must concentrate more attention on the transmission and may misunderstand portions of the transmission. Systems such as the Motorola system pose a still further problem because the officer must frequently focus attention on the computer screen while filling in forms and checking responses to queries. This substantially increases the danger to the officer as the officer cannot be aware of the surroundings at the same time. The mapping program also poses a problem because it cannot function without the expensive GPS service, can be slow, and is only capable of displaying proprietary maps associated with the GPS, thus depriving the officer of a choice of maps.

SUMMARY OF THE INVENTION

With the foregoing in mind, the present invention advantageously provides an apparatus for communicating with law enforcement during vehicle travel and associated methods that enhances the flow of data to the officer and completes routine officer tasks thus enhancing officer protection and freeing-up officer time. The present invention advantageously provides an apparatus for communicating with law enforcement during vehicle travel which prioritizes pre-recorded human voice responses to officer queries that deliver rapid, easily comprehended responses that allow the officer to maintain visual awareness of the surroundings at all times. The present invention further advantageously provides an apparatus for communicating with law enforcement during vehicle travel which transmits audio alarms to the officer to give the officer immediate warning of degrees of law violation associated with a suspect and also advantageously provides cost effective quick mapping of incident locations responsive to officer call dispatch data without using a GPS unit to track location.

An apparatus for communicating with law enforcement during vehicle travel according to the present invention preferably includes a first computer defining a department server in communication with at least one law enforcement database to supply law enforcement data to officers positioned in vehicles located remote from the department server. The apparatus also includes a vehicle computer positioned within a law enforcement vehicle in communication with the department server and in communication with at least one audio speaker. The vehicle computer preferably has mobile data communications software stored or positioned thereon to facilitate officer communication with the department server through the vehicle computer and to transmit and receive law enforcement data from the at least one law enforcement database through the department server. The vehicle computer further preferably has officer communication enhancing software stored or positioned thereon and in communication with the mobile data communications software to enhance officer communication with the department server through the vehicle computer. The officer communications enhancing software preferably includes an audio communicator positioned to transmit enhanced audio law enforcement data received from the mobile data communications software to the officer through the at least one audio speaker. The enhanced audio law enforcement data preferably includes a plurality of preselected and prerecorded audio messages responsive to the law enforcement data received from the mobile data communications software.

These preselected and prerecorded data messages advantageously can be in a format much more user-friendly and effective to law enforcement officers. For example, instead of the exact date of birth of an individual being voiced to the officer, e.g., Aug. 12, 1977, the preselected and prerecorded message can voice to the officer "24 year old." Accordingly, the audio communicator preferably not only transmits the messages to the officer, but also advantageously analyzes, selects, and converts data to the preselected and prerecorded messages.

The law enforcement department computer defining a department server can advantageously be in communication with a plurality of remote law enforcement vehicle computers and preferably uses radio frequency to transmit and receive data. The department server is also preferably in communication with at least one and preferably a plurality of remote computers and possibly a local computer having law enforcement data defining law enforcement databases preferably through a communications network such as a global communication network like the Internet or a local communication network. The vehicle computer preferably includes mobile data communications software and officer communication enhancing software. The apparatus can also advantageously include a form completing enhancer having at least one incident form database to generate and populate a plurality of preselected incident forms and a quick mapper responsive to officer call dispatch data including an incident location to quickly generate and display a top plan street view map of the incident location.

Methods of enhancing communication with a law enforcement officer positioned in a law enforcement vehicle are also provided. One method preferably includes detecting law enforcement data received from a law enforcement database in communication with the vehicle, parsing the detected law enforcement data for preselected data fields, and audio announcing preselected and prerecorded audio messages responsive to data within the preselected data fields. The method can further include indicating levels of law violation and transmitting an audio alarm to the officer corresponding to the level of indicated law violation.

Another method of enhancing communication with a law enforcement officer positioned in a law enforcement vehicle according to the present invention preferably includes detecting law enforcement data received from a law enforcement database in communication with the vehicle, parsing the detected law enforcement data for preselected data fields, and populating preselected data fields in an incident form on the vehicle computer with the preselected data. The method can further include populating a plurality of preselected data fields in an incident form with data stored on the vehicle computer responsive to the officer populating a single data field.

A further method of enhancing communication with a law enforcement officer positioned in a law enforcement vehicle having a vehicle computer positioned therein and in communication with a department server according to the present invention, preferably includes detecting incident location data received in a dispatch transmission to the vehicle computer from the department server, generating a map of an incident location responsive to the incident location data, and displaying the map responsive to an officer request for map data. The map data preferably is a top plan street view map of the incident location. The method can further include importing the incident location data into a preexisting map database and then displaying a map from the map database.

The quick mapper of the present invention advantageously allows the officer or police department to choose between mapping programs rather than being dependent on a mapping program associated with a GPS unit. The form completing enhancer of the present invention further advantageously reduces officer errors in form completion as the majority of the form is completed with data drawn from law enforcement databases.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 10 is a schematic block diagram showing a vehicle computer in communication with at least one speaker, a high impact printer, and a non-high impact printer of an apparatus for communicating with law enforcement during vehicle travel according to the present invention;

FIG. 11 is a schematic block diagram of a vehicle computer of an apparatus for communicating with law enforcement during vehicle travel according to the present invention;

FIG. 12 is a schematic block diagram of memory of a vehicle computer of an apparatus for communicating with law enforcement during vehicle travel according to the present invention;

DETAILED DESCRIPTION OF THE PREFERRED EMBODIMENTS

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments.

Figure 1:
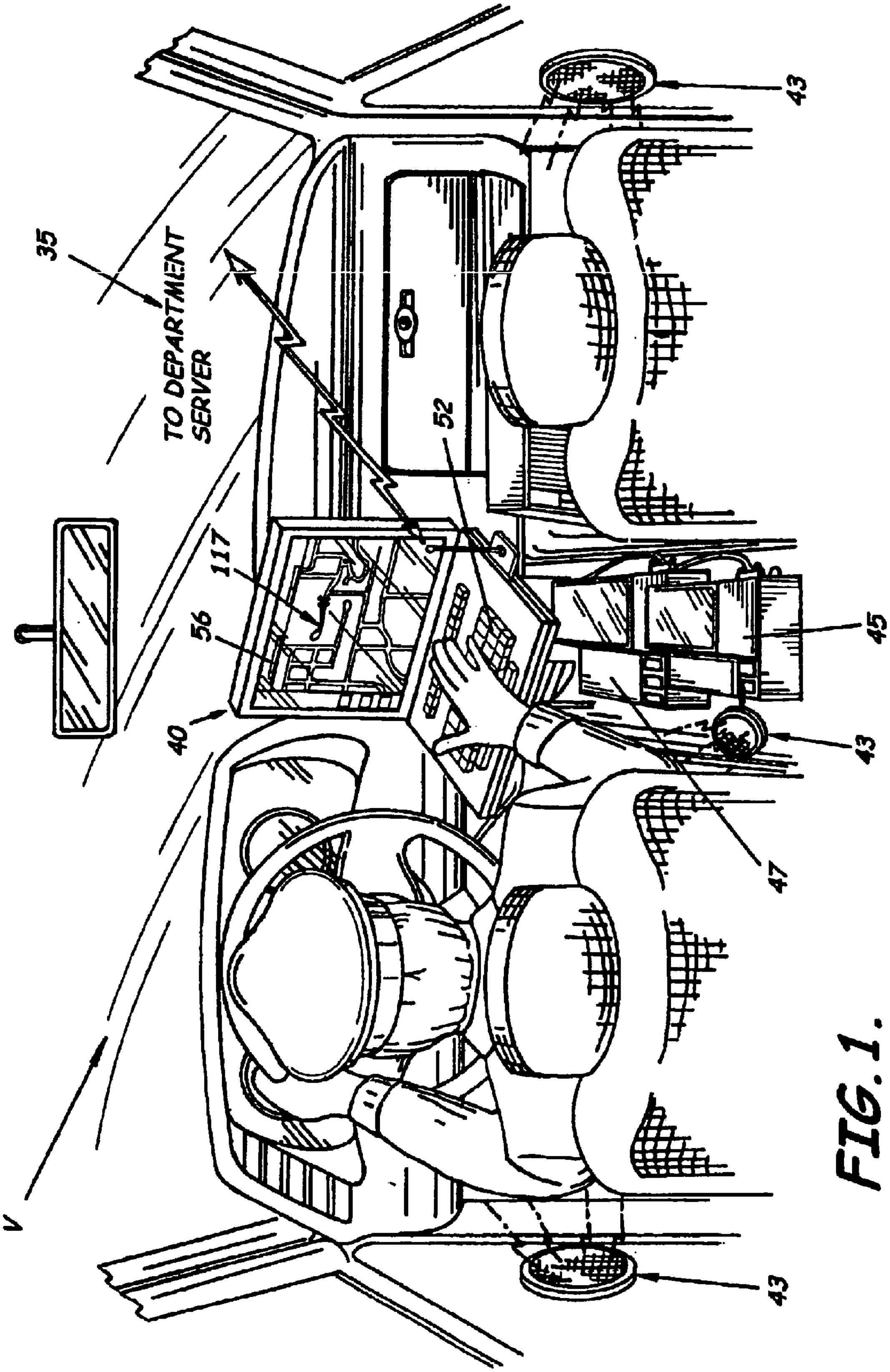
FIG. 1 is an environmental perspective view of a law enforcement vehicle having an apparatus for communicating with law enforcement during vehicle travel according to the present invention.
Figure 9:
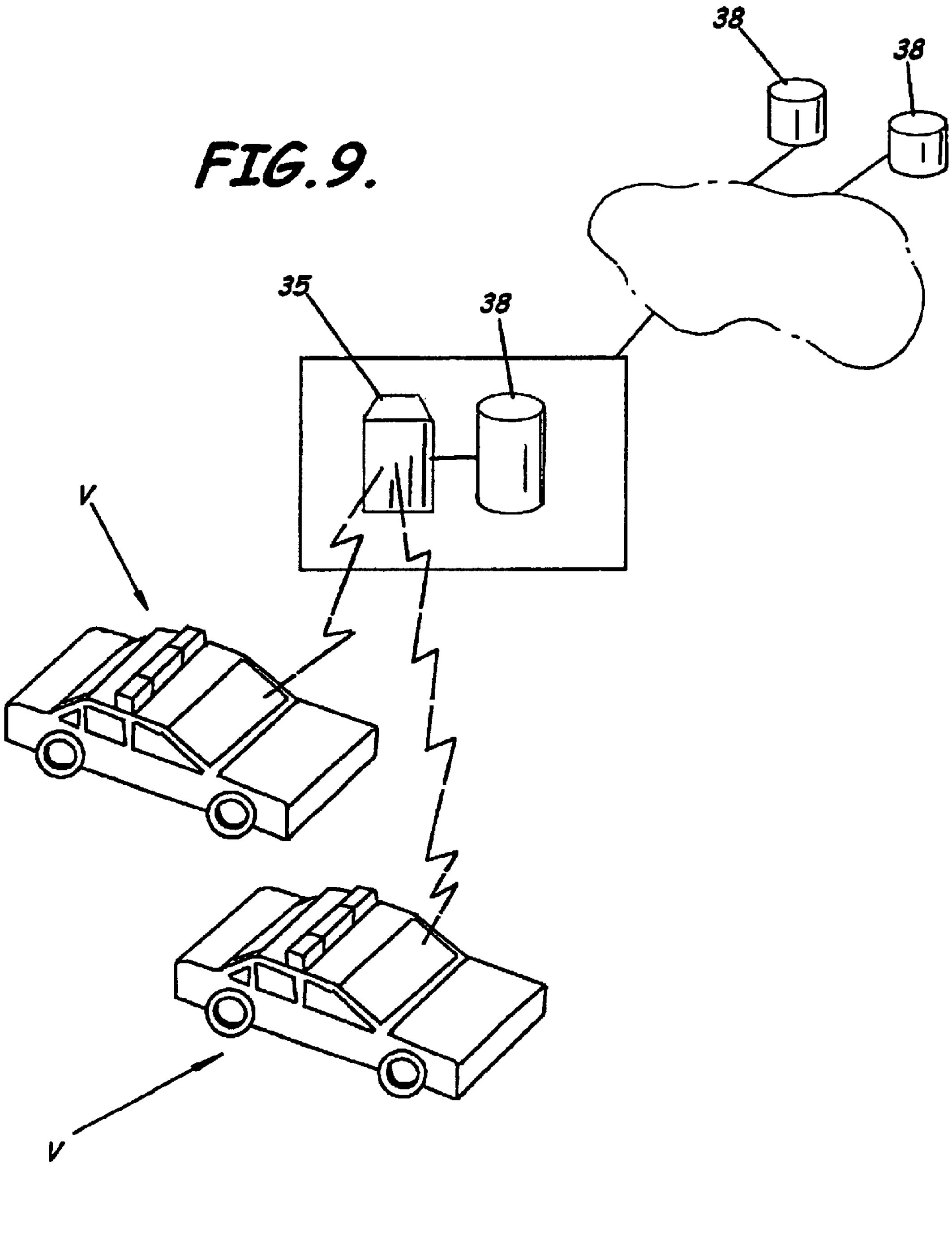
FIG. 9 is a schematic block diagram of an apparatus for communication with law enforcement during vehicle travel according to the present invention.

As best shown in FIGS. 1 and 9, the present invention provides an apparatus 30 for communicating with law enforcement during vehicle travel and associated methods. The apparatus 30 for communication with law enforcement during vehicle travel advantageously provides superior organization, prioritization, and delivery of law enforcement data and populates law enforcement documents with required data. As shown in FIG. 12, the apparatus 30 is preferably designed to be used in conjunction with existing mobile data communications systems such as the Premier MDC system manufactured by the Motorola Corporation of Schaumberg, Ill. As shown in FIGS. 1 and 9, the apparatus 30 preferably includes a law enforcement department computer defining a department server 35 in communication with one or more remote law enforcement vehicle computers 40 each positioned in a law enforcement vehicle. The department server 35 preferably uses radio frequency to transmit and receive data to the vehicle computer 40. The department server 35 is also preferably in communication with at least one and preferably a plurality of remote computers and possibly a local computer having law enforcement data defining law enforcement databases 38 preferably through a communications network such as the Internet or a local area network. The law enforcement databases 38 can include local, regional, or national law enforcement data such as the Department of Highway Safety and Motor Vehicles (DHSMV) database and the National Crime Data Center (NCIC) database. These databases, for example, can provide vehicle and individual background for officers when positioned in vehicles as well as for law enforcement personnel in a headquarters or control center.

As perhaps best shown in FIG. 11, the vehicle computer 40 preferably includes a processor 55 to process communications and other type of data, an officer display 56 in communication with the processor 55 to display data to an officer O, memory 53, e.g., RAM and ROM, also in communication with the processor 55 for storing software and data therein, a power outlet 57 positioned to supply power to the processor 55 as well as other components of the computer 40, a keyboard 52 in communication with the processor 55 to supply a user interface to the officer O, and an RF transceiver 54 in communication with the processor 55 to transmit and receive data. As shown in FIGS. 1 and 10, the vehicle computer 40 is also preferably in communication with at least one and preferably a plurality of vehicle speakers 43 for delivering law enforcement data in audio form. The speakers 43 are preferably external speakers but can be speakers built into the computer or a preexisting speaker associated with a non-computer dispatching system as understood by those skilled in the art. As shown in FIGS. 1, 3, 7, and 10, the vehicle computer 40 is also preferably in communication with a high impact printer 45 and a non-high impact printer 47 for printing accident reports, tickets, warnings, towing citations, or filling in or populating other law enforcement forms. The printers 45,47 are preferably connected to the vehicle computer 40 by a universal serial bus hub, but can also be connected using a parallel cable or some other physical connection as known to those skilled in the art. The high impact printer 45 is preferably a dot matrix printer such as an Epson TM U590 or some other high impact printer capable of delivering enough pressure to an incident form such as a citation form 97 to transmit all data to the copies underlying the uppermost printed form. These copies are preferably attached to the form. Where pre-printed forms are used, only the data is transmitted from the form enhancing populator. This data is used to fill or complete blanks on the pre-printed form. Where the use of pre-printed forms is not necessary, the non-high impact printer 47 can be used to print the data and the form from the form display GUI 94 onto blank paper inserted into the non-high impact printer 47.

Figure 2:
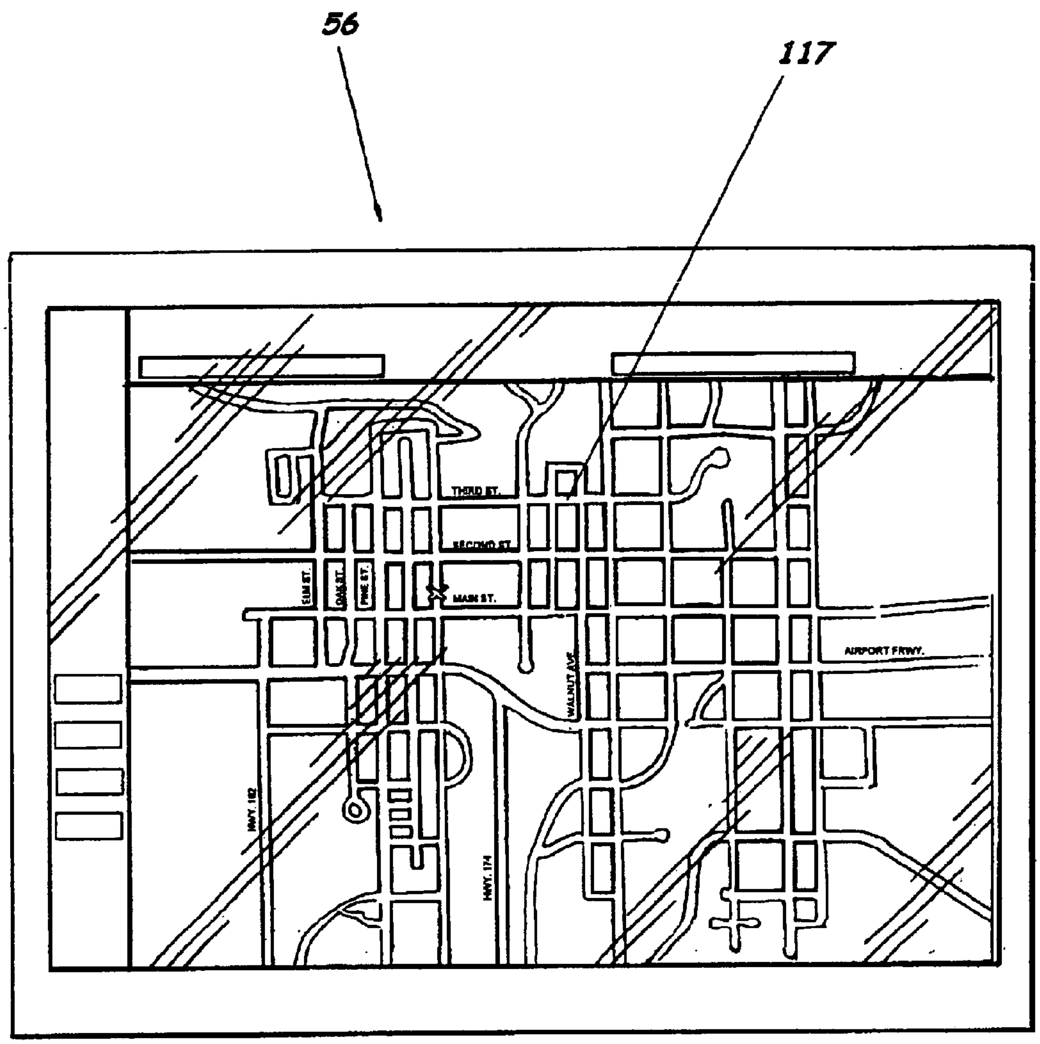
FIG. 2 is a front plan view of an officer display of a vehicle computer showing a top plan street view map of an incident location according to the present invention.
Figures 3, 3A:
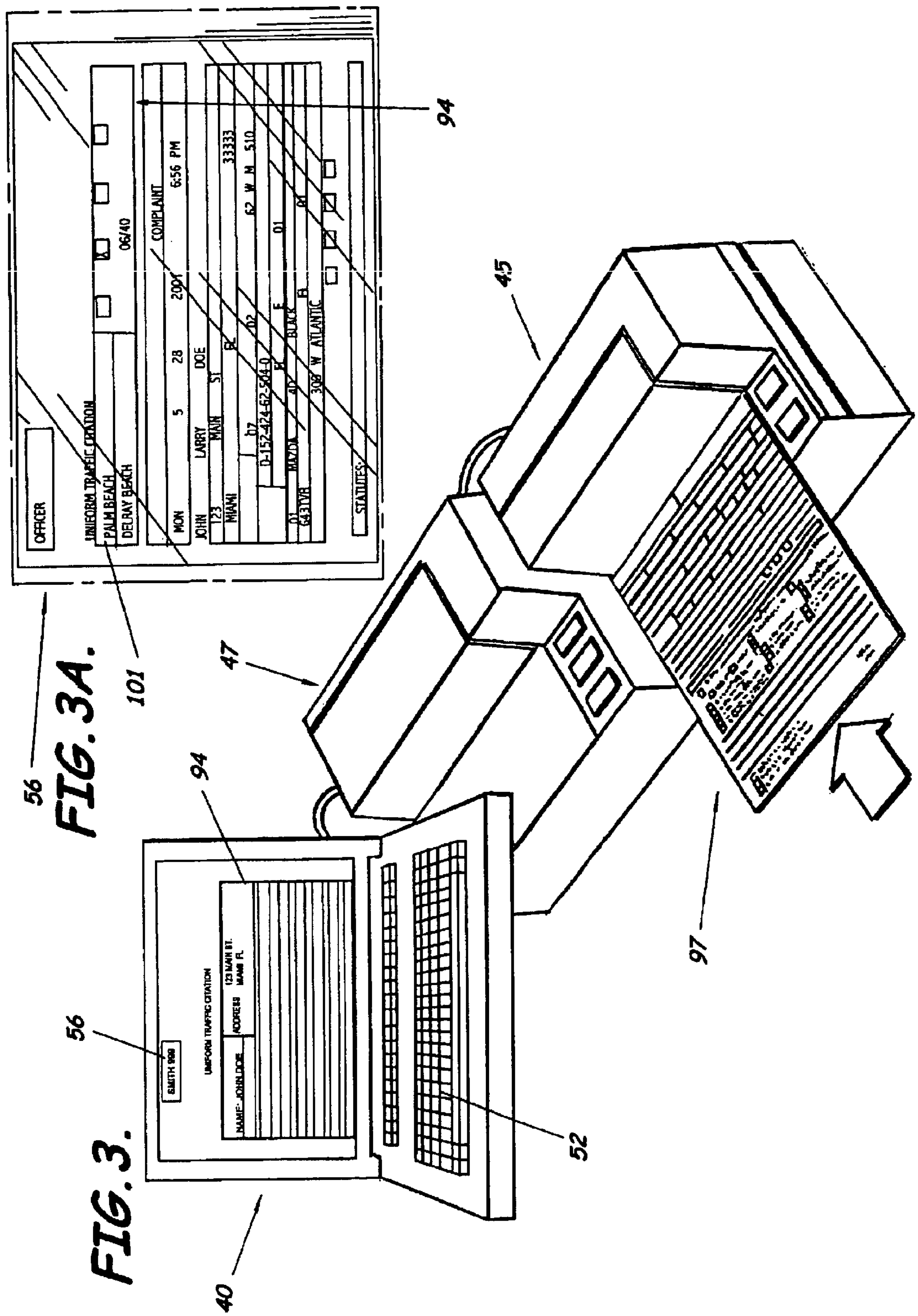
FIG. 3 is a perspective view of a populated citation form on the officer display and a separate but related multi-layer citation form entering a high impact printer of an apparatus for communicating with law enforcement during vehicle travel according to the present invention.
FIG. 3A is an enlarged perspective view of the populated citation form on the officer display according to the present invention.
Figure 13:
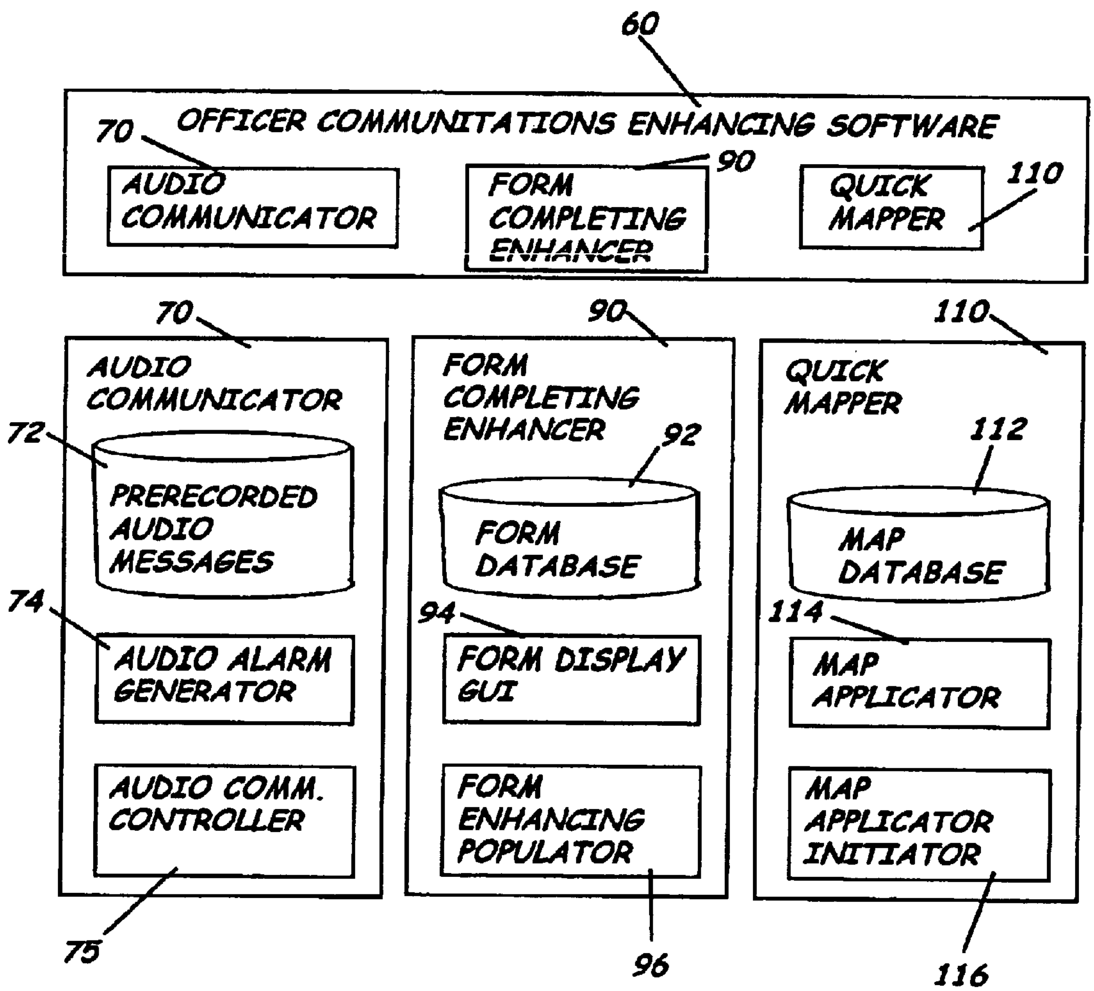
FIG. 13 is a schematic block diagram of officer communications enhancing software of an apparatus for communicating with law enforcement during vehicle travel according to the present invention.
Figure 14:
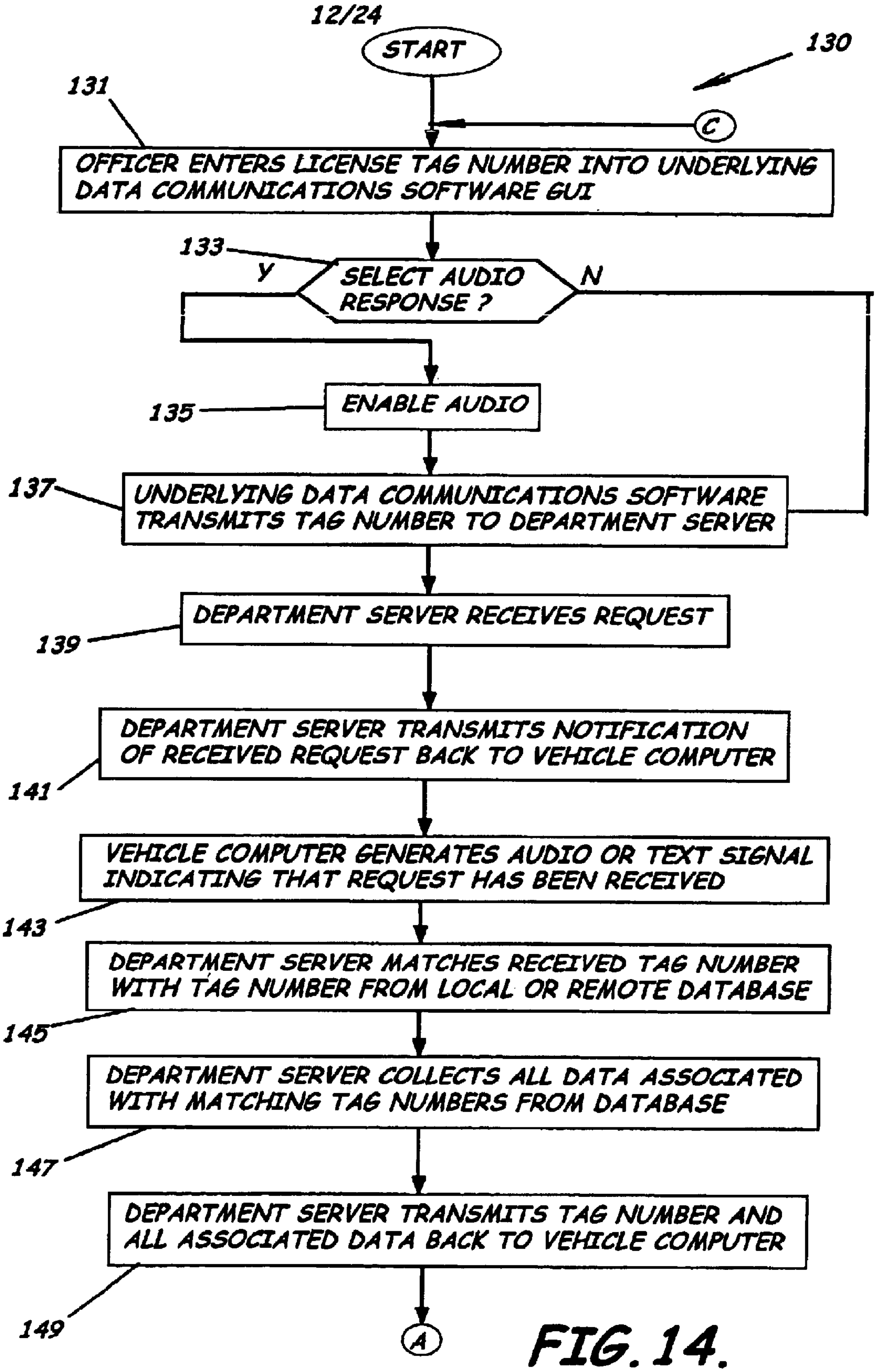
FIG. 14 is a schematic flow chart showing an officer requesting vehicle data from a department server with the option to select an audio response of officer communications enhancing software of an apparatus for communicating with law enforcement during vehicle travel according to the present invention.

As perhaps best shown in FIGS. 13 and 14, the vehicle computer 40 preferably includes mobile data communications software 58 to facilitate officer O communication with the department server 35 through the vehicle computer 40 and to transmit and receive law enforcement data from the at least one law enforcement database 38 through the department server 35. The vehicle computer 40 further preferably includes officer communications enhancing software 60 in communication with the mobile data communications software 58 to enhance officer O communication with the department server 35. The officer communications enhancing software 60 preferably includes one or more of an audio communicator 70 positioned to transmit enhanced audio law enforcement data received from the mobile data communications software 58 to the officer O through the at least one speaker 43, a form completing enhancer 90 including at least one form database 92 to generate and populate a plurality of preselected incident forms, and a quick mapper 110 responsive to officer O call dispatch data including an incident location to quickly generate and display a top plan street view map 117 of the incident location (see FIGS. 1–2).

The audio communicator 70 advantageously provides audio alarms and prerecorded human voice audio responses to officer O requests for data preferably transmitted through speakers 43 attached to the vehicle computer 40. These responses are preferably prioritized so that predetermined priority data is transmitted first and are edited so that predetermined data of lesser importance is not transmitted by audio at all. These preselected and prerecorded data messages preferably are in a format much more user-friendly and effective to law enforcement officers. For example, instead of the exact date of birth of an individual being voiced to the officer, e.g., Aug. 12, 1977, the preselected and prerecorded message can voice to the officer "24 year old." Accordingly, the audio communicator preferably not only transmits the messages to the officer, but also advantageously analyzes, selects, and converts data to the preselected and prerecorded messages. Also, information that is not needed or helpful to an officer can readily be eliminated or dropped, such as zip-codes or other extraneous data or information. The database of the preselected and prerecorded messages preferably is quite broad in its range of selections and is preferably based on familiarity with data from NCIC, DHSMV, or other databases. Further, the voice messages can be much more intelligible and can be preselected to be male, female, soothing, urgent sounding or have other desired qualities in addition to selected languages, accents, intonations or other voice language benefits instead of what is often robotic, stiff or stilted sounding from conventional text-to-voice messages.

Figure 15:
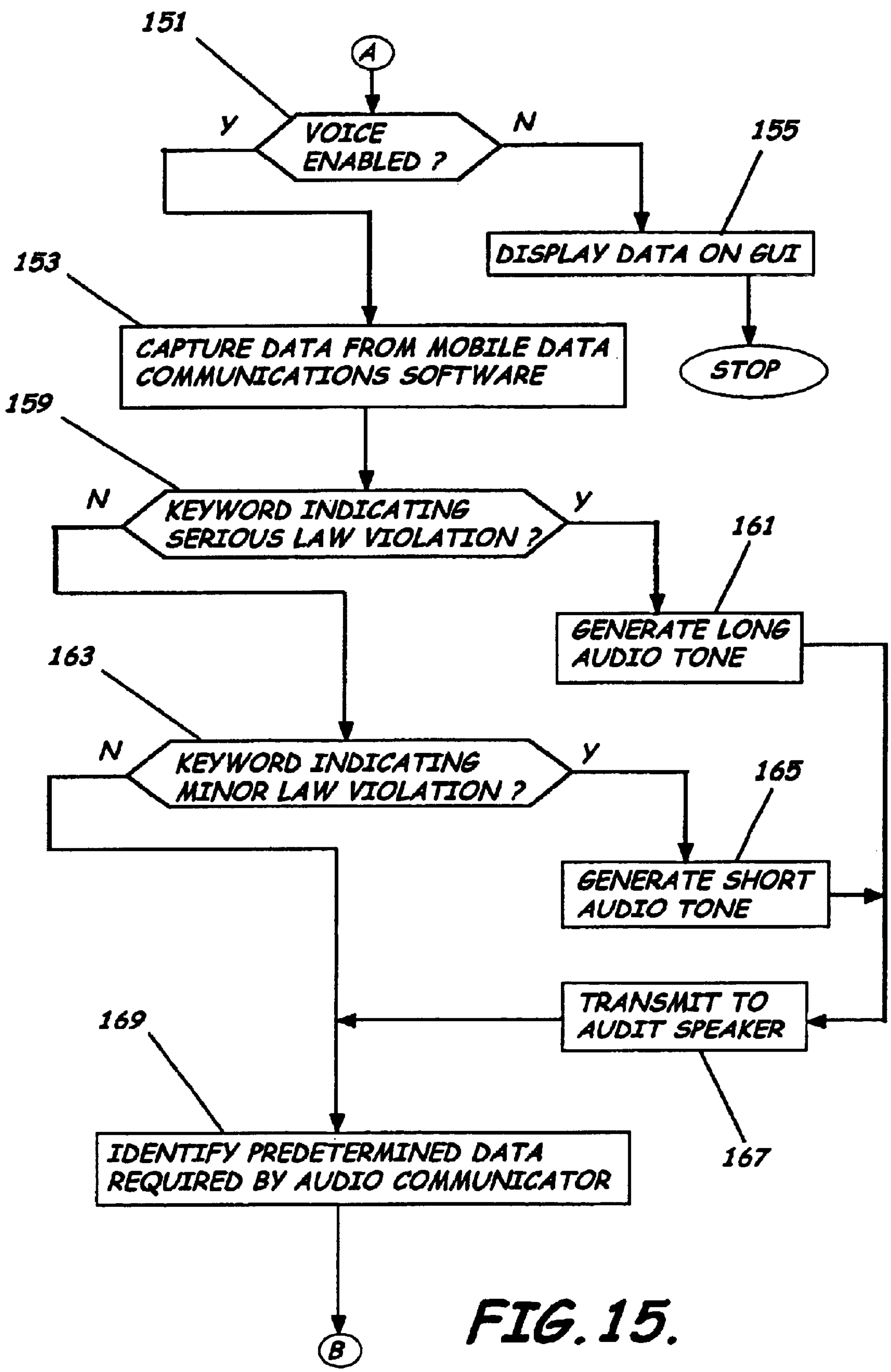
FIG. 15 is a schematic flow chart showing data capture by an audio communicator and audio alarm generation of officer communications enhancing software of an apparatus for communicating with law enforcement during vehicle travel according to the present invention.
Figure 16:
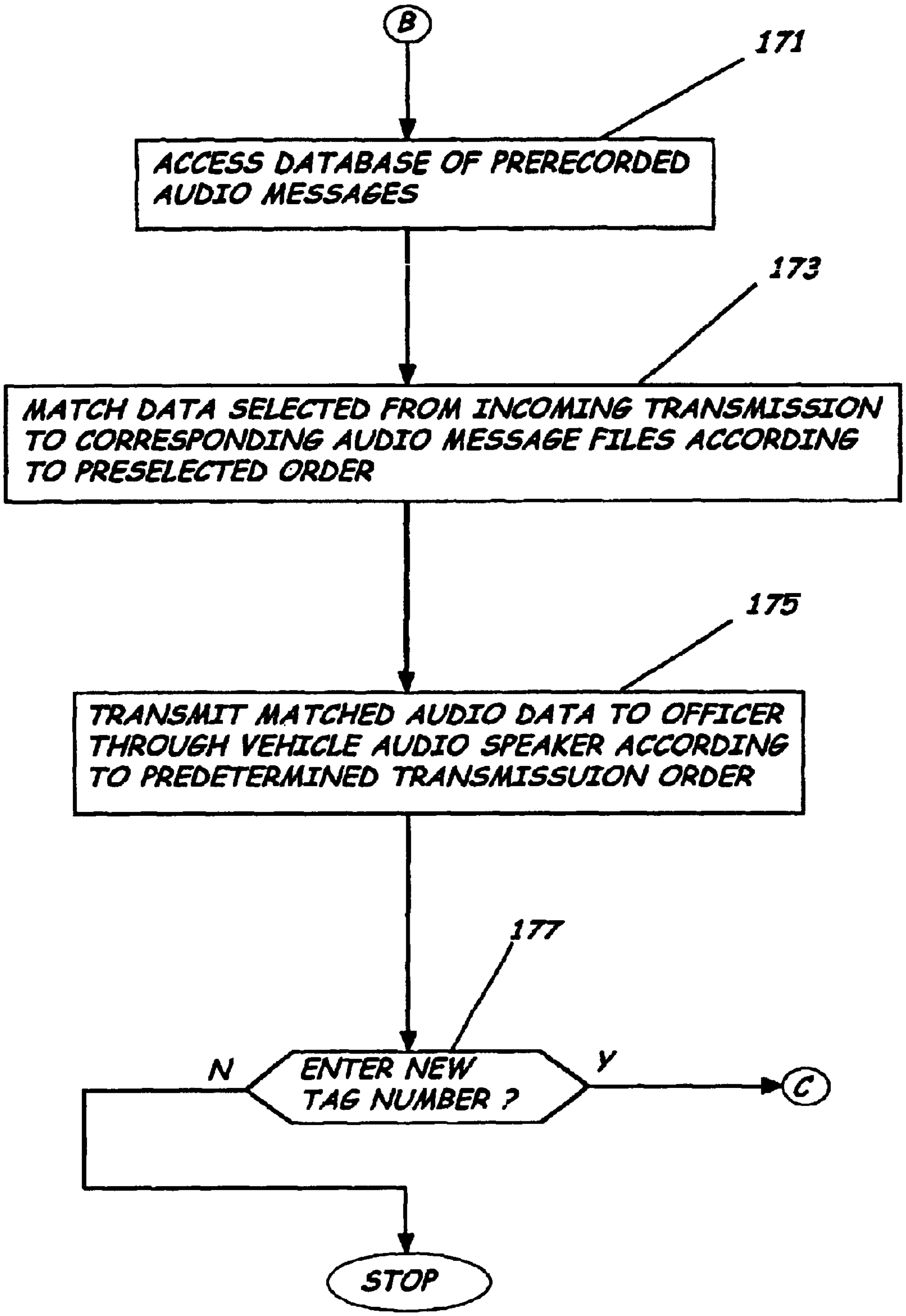
FIG. 16 is a schematic flow diagram showing assembly and transmission of audio data to an officer of an apparatus for communicating with law enforcement during vehicle travel according to the present invention.

The prerecorded human voice responses can be preceded by audio alarms produced by an audio alarm generator 74 responsive to preselected law violation data received from the mobile data communications software 58. As shown in FIG. 15, the audio alarms, for example, can include a shorter tone to be transmitted where a predetermined lesser degree of law violation is identified and a longer tone to be transmitted where a predetermined greater degree of law violation is identified. The audio communicator 70 further preferably includes a plurality of preselected and prerecorded human voice audio messages 72 and an audio communicator controller 75 to control the conversion of text or data messages to audio messages. As shown in FIG. 16. the audio communicator controller 75 preferably generates the audio message to be transmitted by matching the predetermined priority data in an incoming text response with the preselected and pre-recorded audio data to rapidly assemble a message to be delivered to the officer O.

An example of how the audio communicator 70 can be used is shown in FIGS. 14–16. When driving a law enforcement vehicle V, the officer O can enter a license plate number into the mobile data communications software interface preferably using the vehicle computer keyboard 52 (as shown in block 131). Further references to the flow diagram block reference numbers will be done using block and block number surrounded by parentheses. At this point, the officer O preferably selects either an audio response (block 133) or text response to the query. If the text response is chosen, the officer O will receive the response in the mobile data communications software 58 without the involvement of the audio communicator 70 of the officer communications enhancing software 60 (block 155). Alternatively, if the audio response is chosen, the audio communicator 70 is enabled (block 135) and prepares to capture the response that returns from the department server 35.

The mobile data communications software 70 then transmits the request (block 137) preferably using RF to the department server 35. After the department server 35 receives the request (block 139), it transmits a notification back to the vehicle computer 40 informing the officer O that the data request was received (block 141). If a local law enforcement database 38 exists, the department server 35 preferably first searches the local law enforcement database 38 for data related to the license plate number. This preferably occurs by locating a match for the license number or other identifying data (block 145) and then retrieving all of the data grouped with the license number, e.g., name, date of birth, tickets issued to the driver (block 147). If the department server 35 finds a match in the local law enforcement database 38, it then transmits all data associated with the license numbers back to the mobile data communications software 58 on the requesting vehicle computer 40 (block 149). If the department server 35 fails to find a match in the local law enforcement database 38, it then sends a request to at least one remote law enforcement database 38 preferably via a global communications network G. Depending on the nature of the data supplied by the officer O, the department server 35 can forward the request to a remote regional or national law enforcement database 38 without searching a local law enforcement database 38 first. For example, it would not be necessary to search a local law enforcement database 38 if the driver's license number was from a driver's license issued in another state. If the remote law enforcement database 38 locates the requested data, it then transmits the data back to the department server 35 preferably via a global communications network server and the department server 35 passes the data back to the requesting vehicle computer 40.

The data is then received by the mobile data communications software 58. As shown in FIG. 15, if the audio communicator 70 was not enabled during the transmission of the request (block 133), the mobile data communications software 58 then presents the data as text on the officer display 56 of the vehicle computer 40 (block 155). If the audio communicator 70 was enabled (block 151) during request transmission, the audio communicator 70 preferably immediately captures the response (block 153). The audio alarm generator 74 then preferably parses the response data searching for keywords or a data string indicating a serious law violation, e.g., stolen car, car used in felony, associated with the vehicle (block 159). If the audio alarm generator 74 finds data indicating a serious law violation, the audio alarm generator 74 then preferably generates an audio tone associated with serious law violation such as a long audio tone (block 161). If the audio alarm generator 74 does not find data indicating a serious law violation, it then parses the response for data indicating a less serious law violation (block 163). If the audio alarm generator 74 finds data indicating a less serious violation, it then generates a separate tone associated with less serious law violation such as a short audio tone (block 165). If either serious or less serious law violation data is found, the audio alarm generator 74 then transmits the appropriate tone to the officer O over one or more of the speakers 43,47 in communication with the vehicle computer 40 (block 167). If no data indicating law violation is found, the audio alarm generator 74 does not generate any audio alarm.

After the audio alarm generator 74 parses the response, the audio communicator 70 parses the response in search of predetermined audio transmission data (block 169). The predetermined transmission data is preferably identified by a data string preceding the data. For example, if the type of car is a part of the predetermined audio transmission data, then the audio communicator 70 could search for a text string such as "make:". The data following the "make:" in the text received by the mobile communications software 58 from the department server 35 is selected as part of the audio transmission data. After the audio communicator 70 identifies the predetermined transmission data, it then preferably deletes the remaining data not associated with one of the predetermined data strings. The audio communicator 70 then preferably accesses the database of prerecorded audio messages 72 (block 171) and compares the text transmission data to the audio messages. The audio communicator 70 then matches the text of the transmission data to the corresponding audio message files (block 173). Preferably at the same time, the files are arranged in a preselected transmission order preferably having the most important data in the first transmission data followed by progressively less important data in order of importance.

Figure 4:
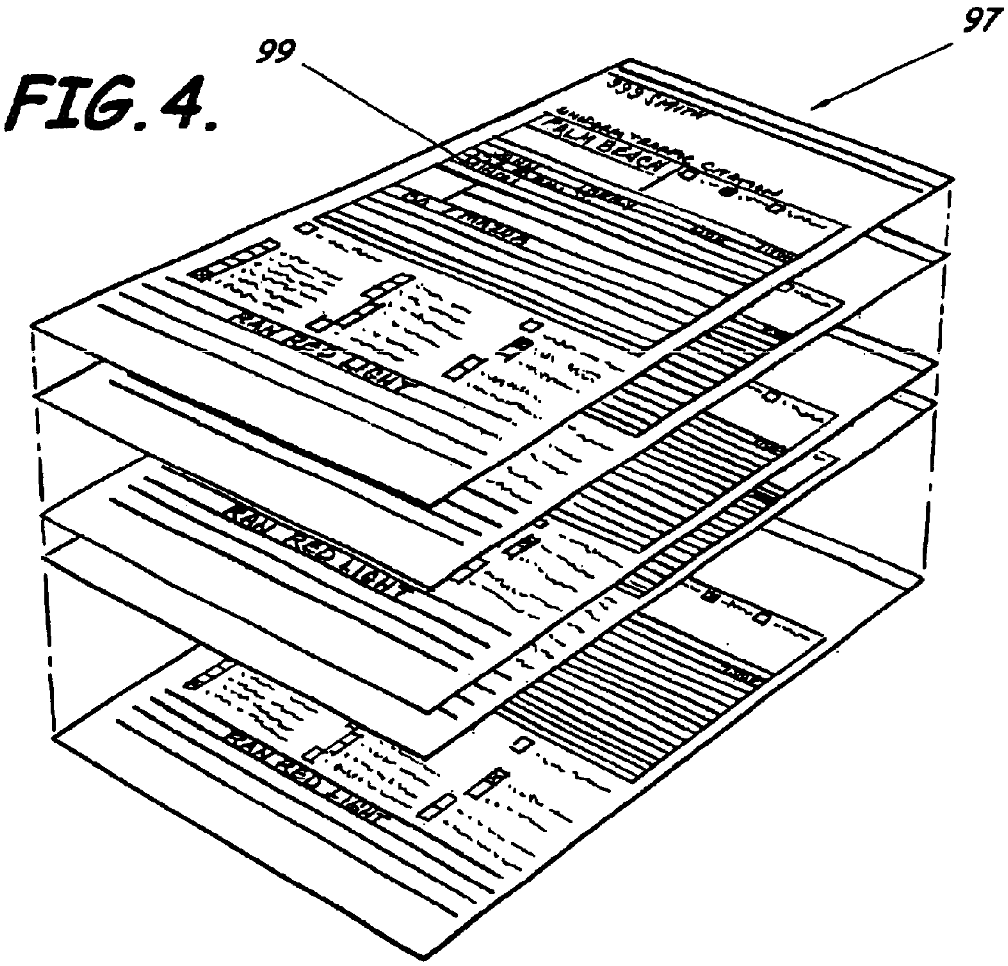
FIG. 4 is an exploded view showing a printed citation form with a plurality of form layers according to the present invention.
Figure 7:
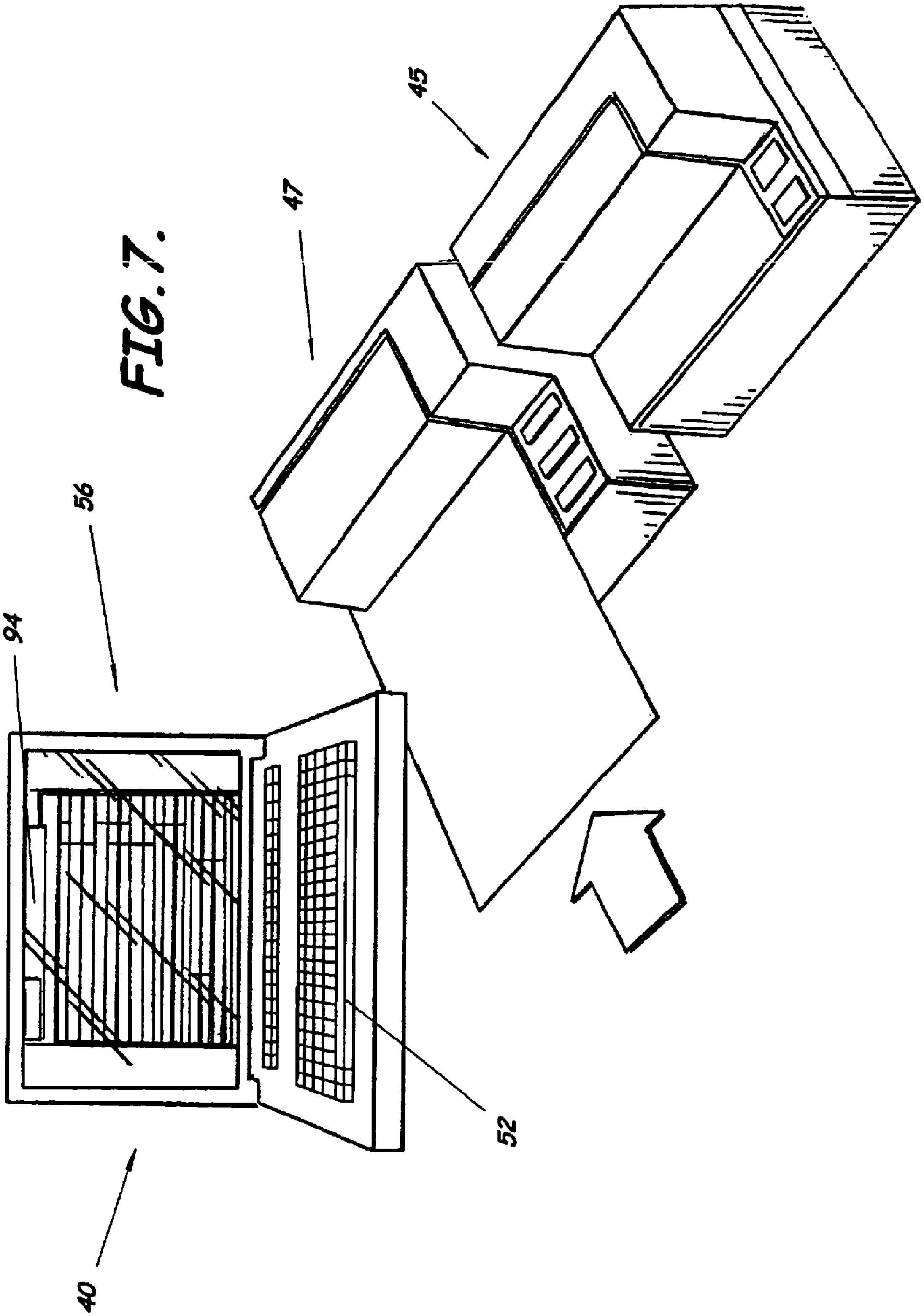
FIG. 7 is a front plan view of an accident form on an officer display of a vehicle computer and blank paper being fed into a non-high impact printer to print the accident form according to the present invention.
Figure 7A:
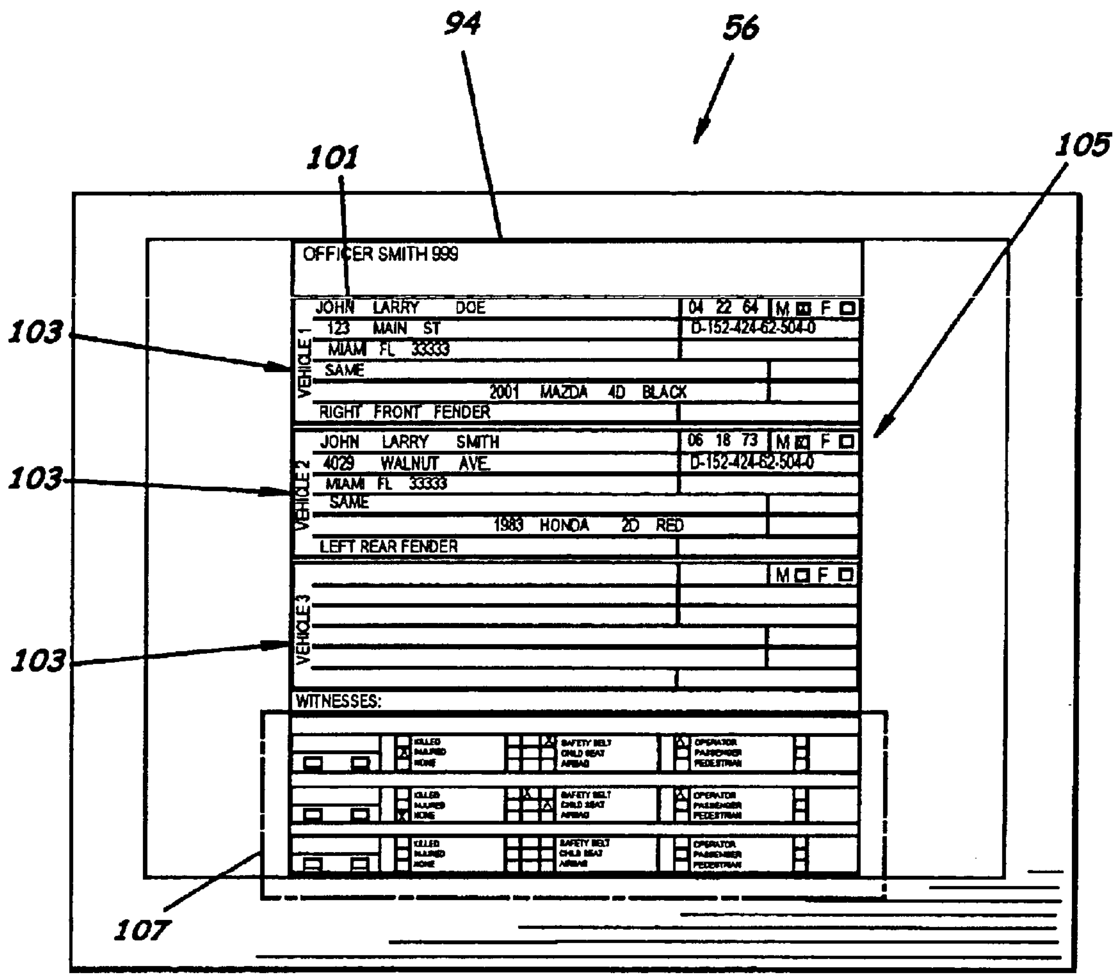
FIG. 7A is a front plan view of the accident form showing prepopulated and officer populated sections according to the present invention.
Figure 7B:
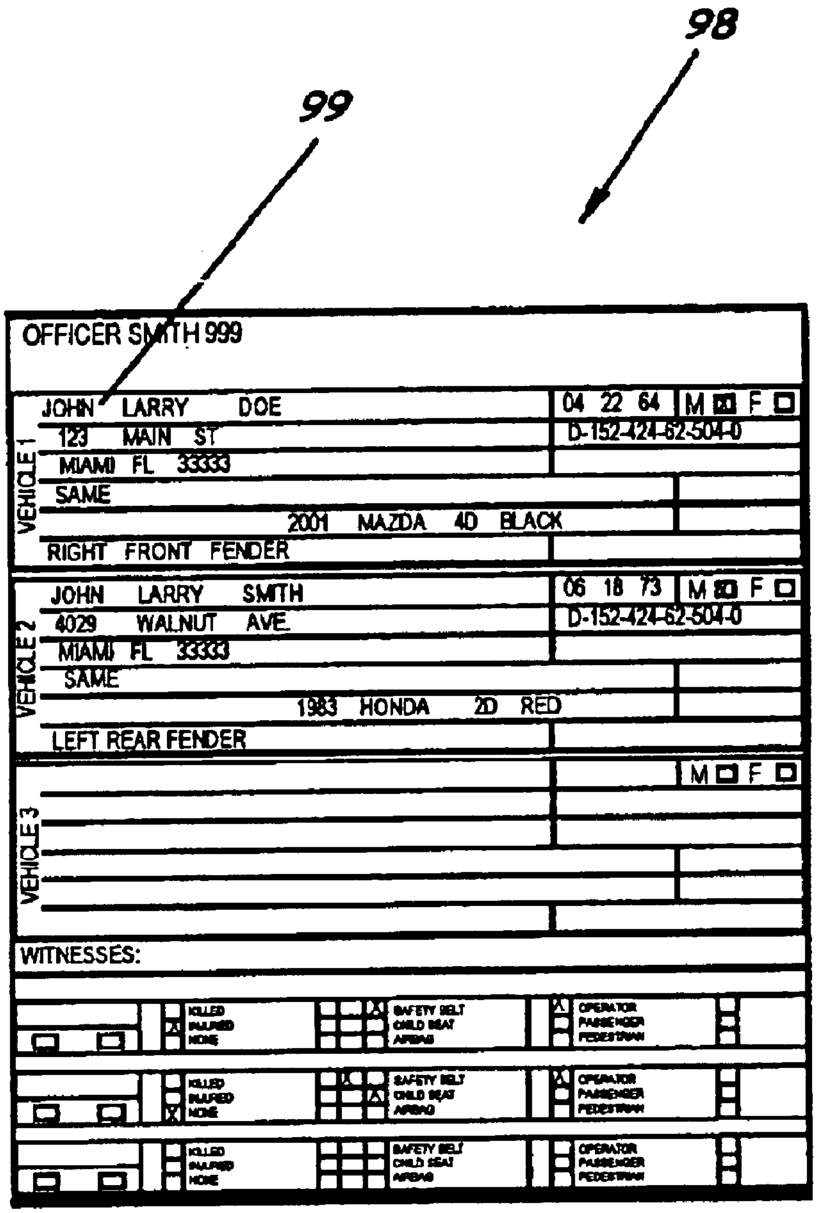
FIG. 7B is a front plan view of a populated accident form that has been printed out using a non-high impact printer of an apparatus for communicating with law enforcement during vehicle travel according to the present invention.

The form completing enhancer 90 preferably includes a form display graphical user interface ("GUI") 94 for simplifying the ticket or other form drafting process and making it faster. The form display GUI 94 is preferably in communication with at least one form database 92 to graphically display one of the preselected incident forms to the officer O. As shown in FIGS. 4 and 7B, the incident forms can be a variety of forms used by law enforcement officers O such as citation forms 97, accident report forms 98, towing report forms, or warning forms. As perhaps best shown in FIGS. 3 and 3A, in certain cases, the forms displayed on the form display GUI 94 correspond to the paper form used by the police department and include data fields 101 for entering data corresponding to the blanks on the paper form. In other cases, and as best shown in FIGS. 7 and 7A, the forms will be, what you see is what you get forms, as known to those skilled in the art where the form is printed exactly as viewed on the officer display 56 onto blank paper. The forms, for example, can be created using the Omniform 4.0 software package available from Scansoft Corporation of Peabody, Md. or some equivalent, like, or related software package. The form completing enhancer 90 further preferably includes a form enhancing populator 96 in communication with the mobile data communications software 58 to receive state data therefrom. Although the term state data is used to describe the law enforcement data received from the department server 35, the data may also be local or federal law enforcement data. After receiving the law enforcement data, the form enhancing populator 96 then selects the data required by the form, matches it to the data fields 101 in the form and populates the form with the law enforcement data. The data fields 101 completed or filled in by the form enhancing populator are the prepopulated data fields 105. There may be data fields 101 required by the form which are not completed by the form completing enhancer. The officer O must complete these forms.

Figure 17A:
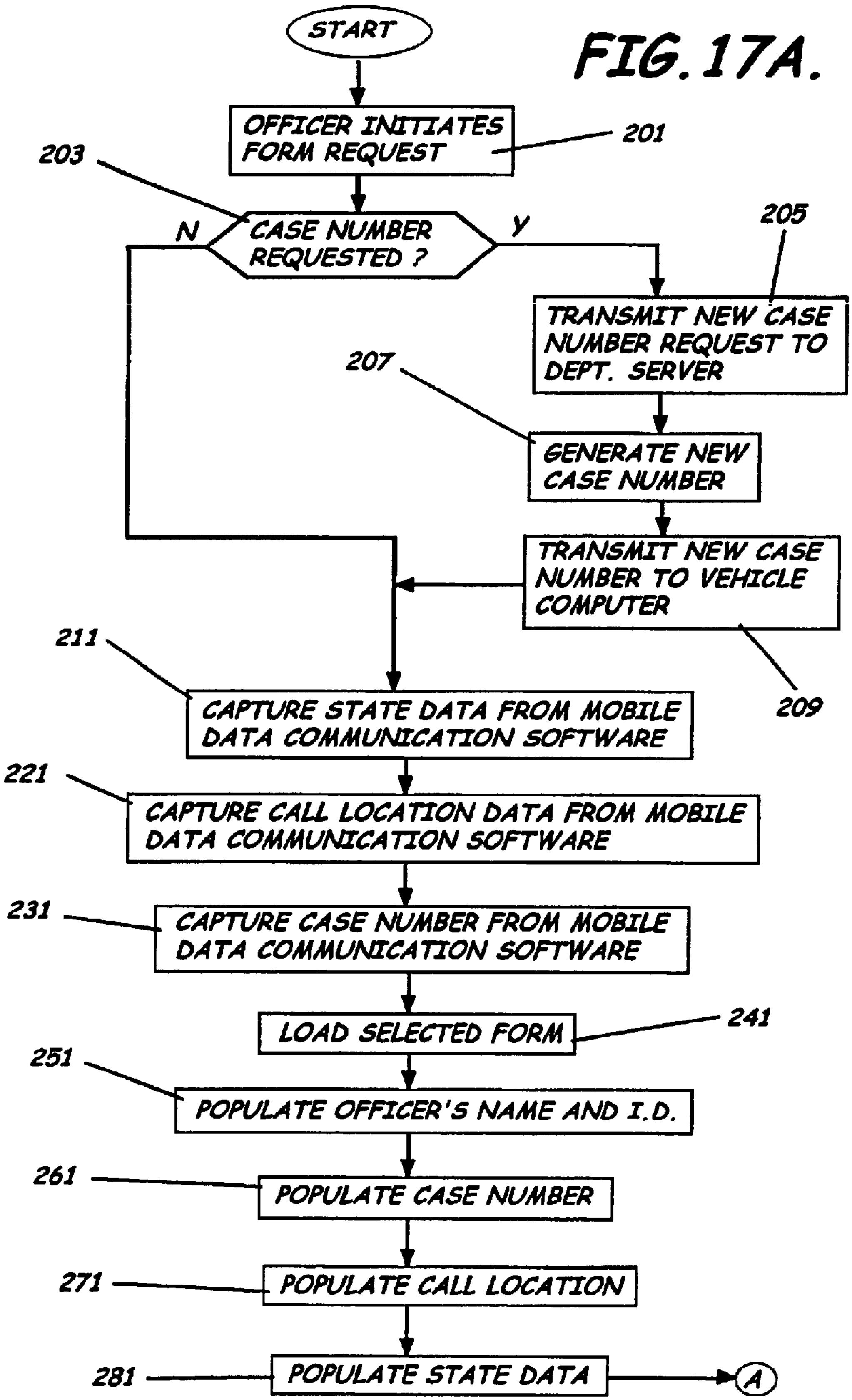
FIG. 17A is a schematic flow chart showing how a form completing enhancer of officer communications enhancing software populates an incident form for an apparatus for communicating with law enforcement during vehicle travel according to the present invention.
Figure 17B:
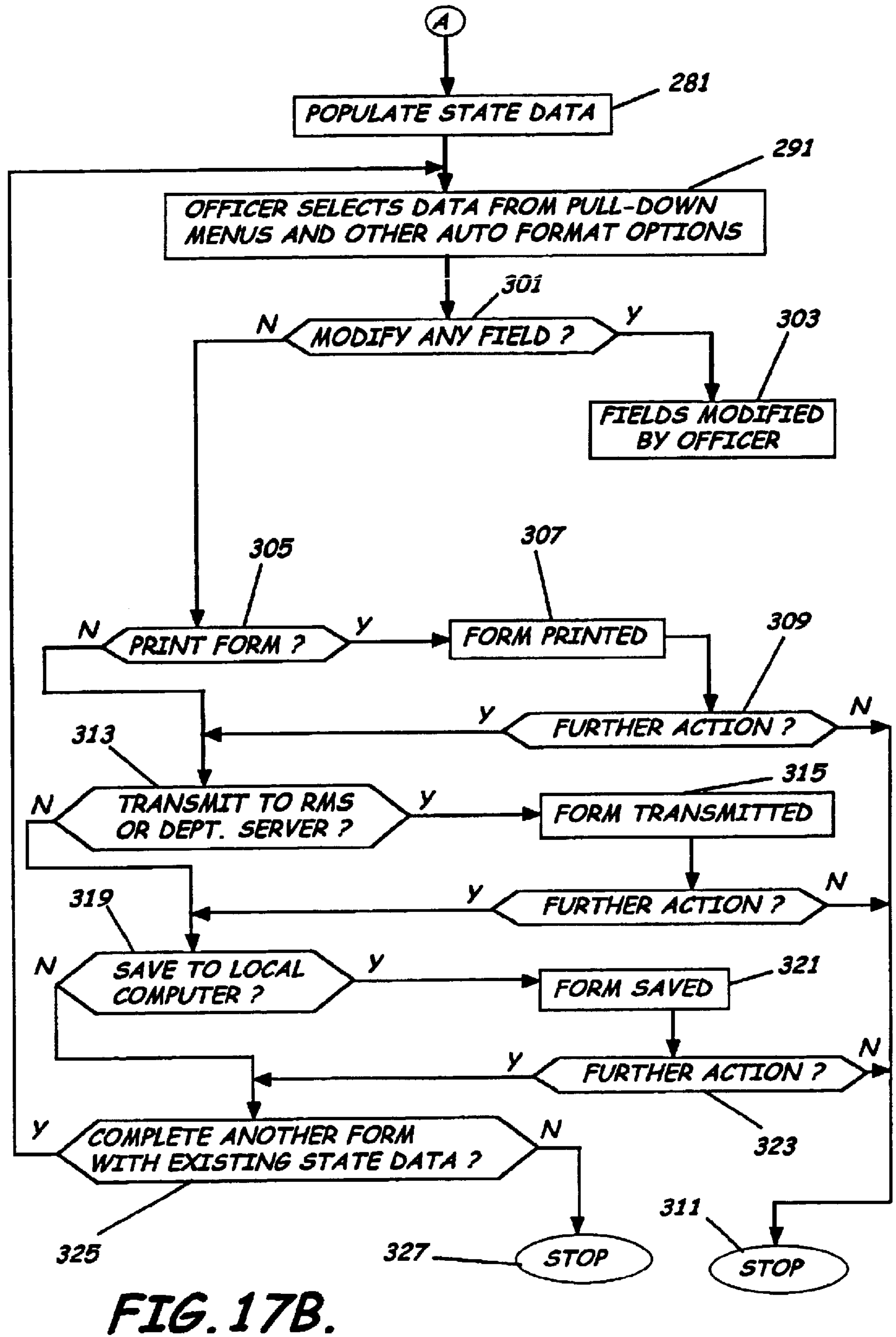
FIG. 17B is a schematic flow chart showing the printing, saving, and transmitting options for a completed form for an apparatus for communicating with law enforcement during vehicle travel according to the present invention.

For purposes of example and illustration, an example of how the form completing enhancer 90 can be used to complete a citation form will now be shown. As best shown in FIGS. 17A and 17B, the officer O initially calls up the citation form completing enhancer 90 on the vehicle computer 40 preferably by using a shortcut key (block 201). The officer O is then preferably presented with the choice to use a case number in the citation or to issue a citation without a case number (block 203). If the officer O chooses to include a case number, the citation form completing enhancer 90 then preferably transmits a new case number request to the mobile data communications software 58 which in turn transmits a request to the department server 35 (block 205). The department server 35 then generates a new case number preferably by selecting a number which is one number higher than the most recently generated case number. The department server 35 then transmits the case number back to the mobile data communications software 58 on the vehicle computer 40 (block 209). In the alternative, however, the case number may be determined by the officer O without communicating with the department server 35 such as by using a case number from a pre-printed form.

Figure 18:
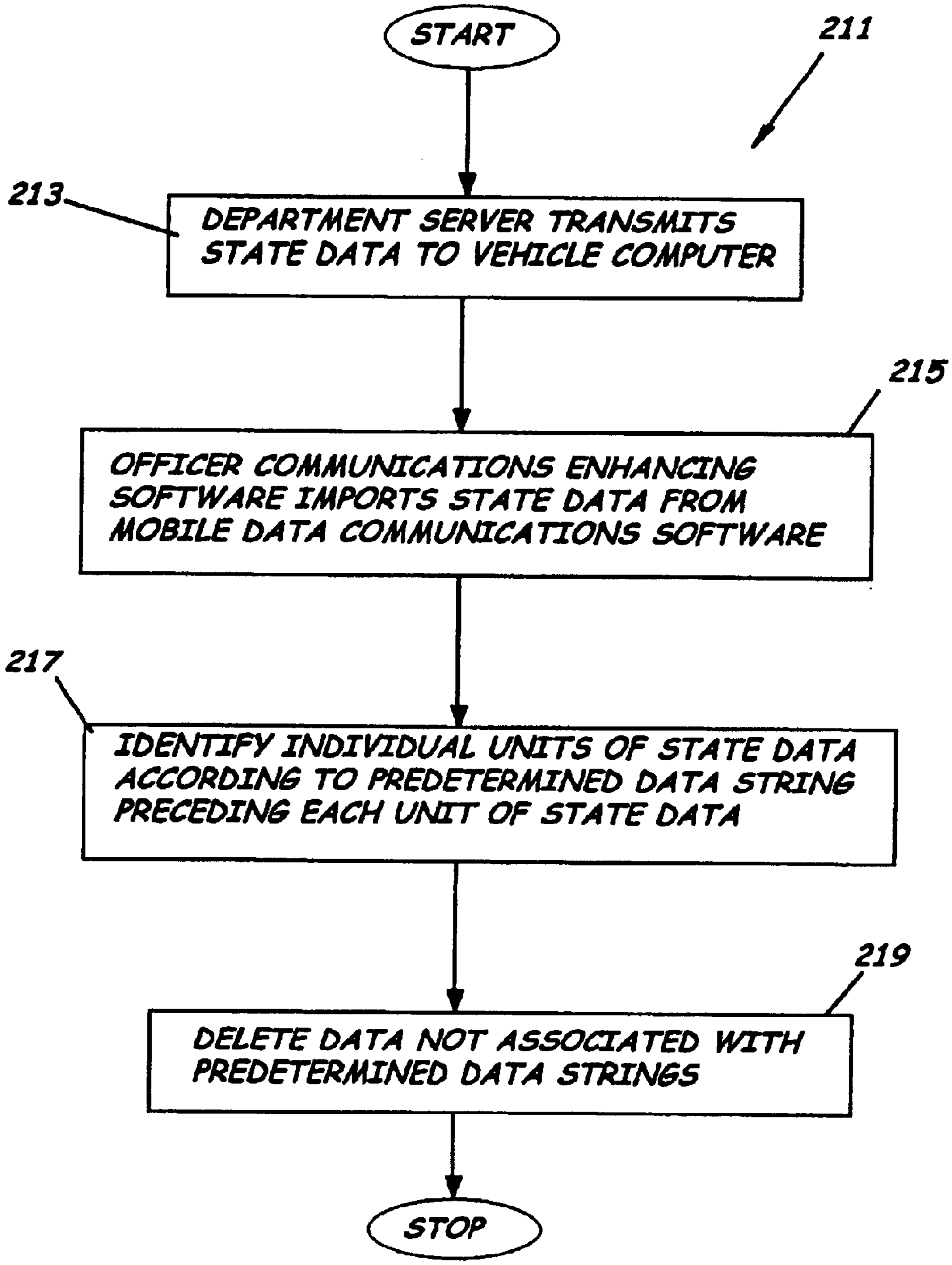
FIG. 18 is a schematic flow diagram showing how a form completing enhancer of officer communications enhancing software of an apparatus for communicating with law enforcement during vehicle travel captures state data according to the present invention.

After the mobile data communications software 58 receives the case number, the officer O then requests citation recipient data. Using the mobile data communications software 58, the officer O enters the citation recipient's license number or some other piece of data which identifies the citation recipient. The request is then transmitted to the department server 35 and a response returned (block 213) preferably following the steps described above for data received by the audio communicator 70. The citation recipient data provided by the law enforcement database 38 preferably includes data such as name, address, license number, and insurance number of the person being ticketed, or data about the vehicle such as the license number, make, model, year, or vehicle identification number (VIN). As shown in FIG. 18, when the citation recipient data is received by the mobile data communications software 58, the citation form completing enhancer 90 then preferably immediately imports the citation recipient data (block 215). Predetermined units of citation recipient data required by the form are preferably identified by the data string preceding the units of data in much the same way as the audio transmission data is identified by the audio communicator 70 (block 217). After the citation recipient data required by the form is identified, the citation form completing enhancer 90 then preferably deletes the data not required by the form (block 219) and stores the data for later retrieval, such as by holding it in random access memory of the vehicle computer 40. After the citation form completing enhancer 90 captures the citation recipient data, it then captures the case number previously transmitted to the mobile data communications software 56 (block 231).

Figure 20:
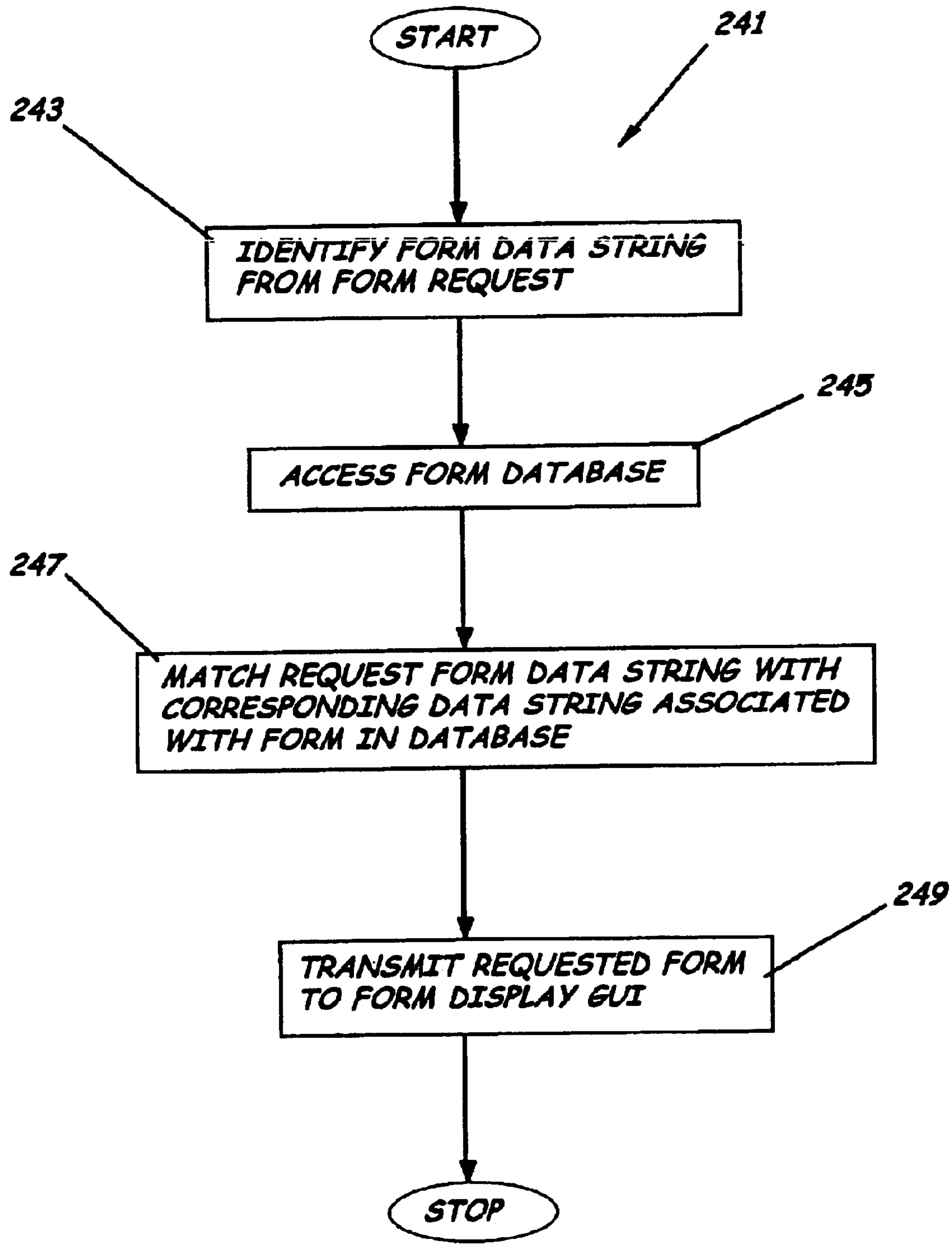
FIG. 20 is a schematic flow diagram showing how a form completing enhancer loads an incident form according to the present invention.
Figure 21:
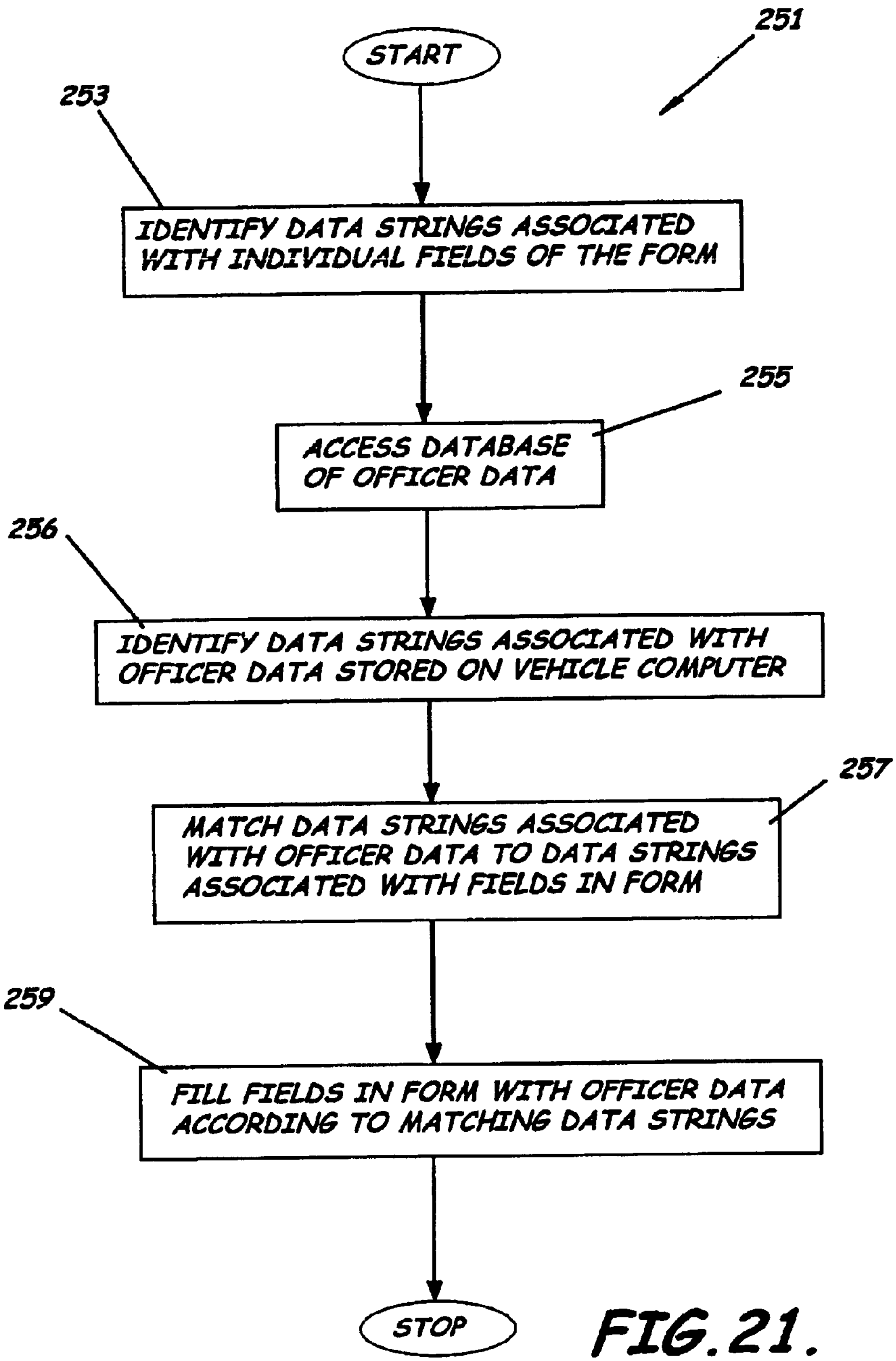
FIG. 21 is a schematic flow diagram showing how a form completing enhancer of officer communications enhancing software of an apparatus for communicating with law enforcement during vehicle travel populates officer data in an accident form according to the present invention.
Figure 22:
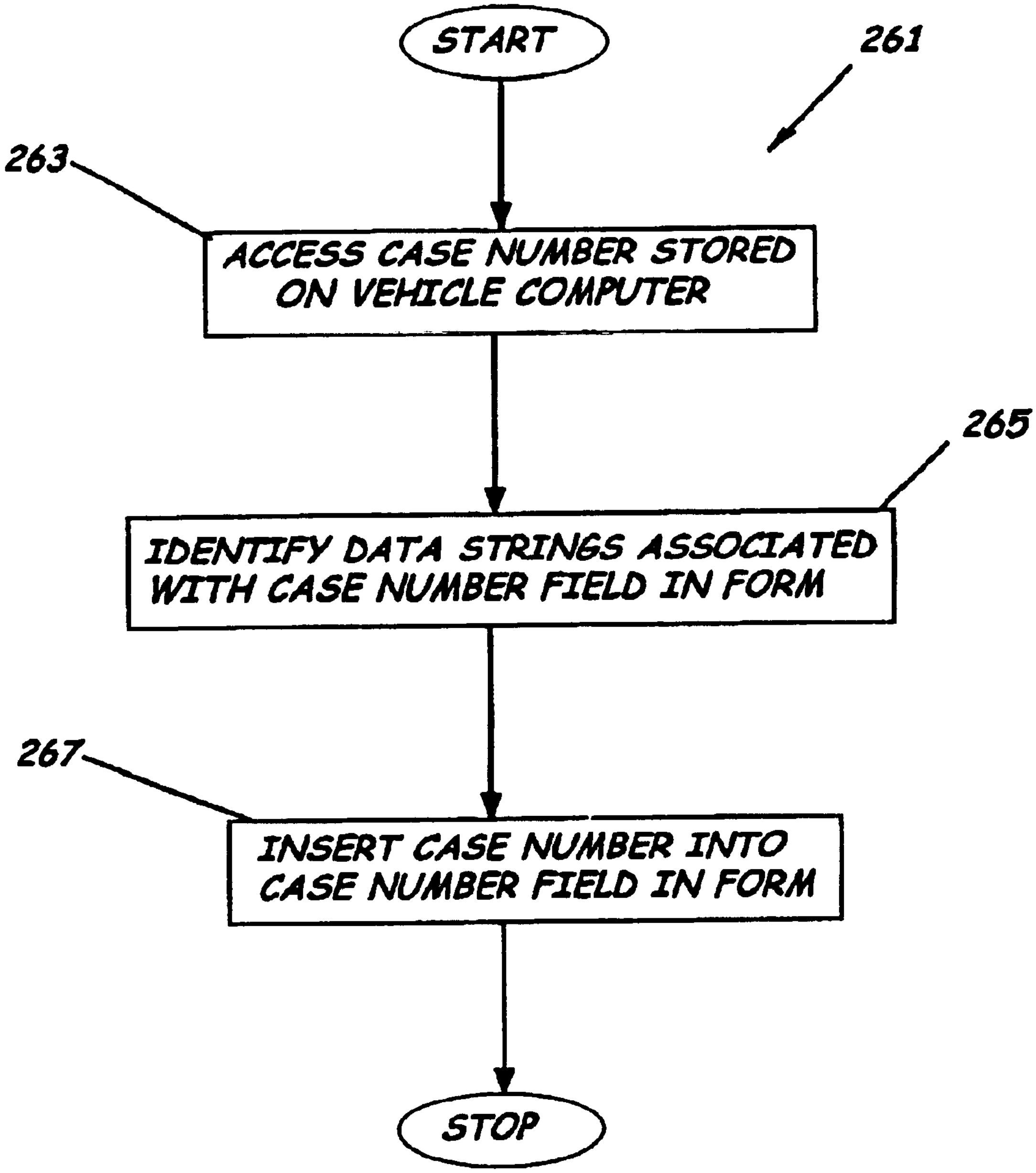
FIG. 22 is a schematic flow diagram showing how a form completing enhancer of officer communications enhancing software of an apparatus for communicating with law enforcement during vehicle travel populates case number data in an accident form according to the present invention.
Figure 23:
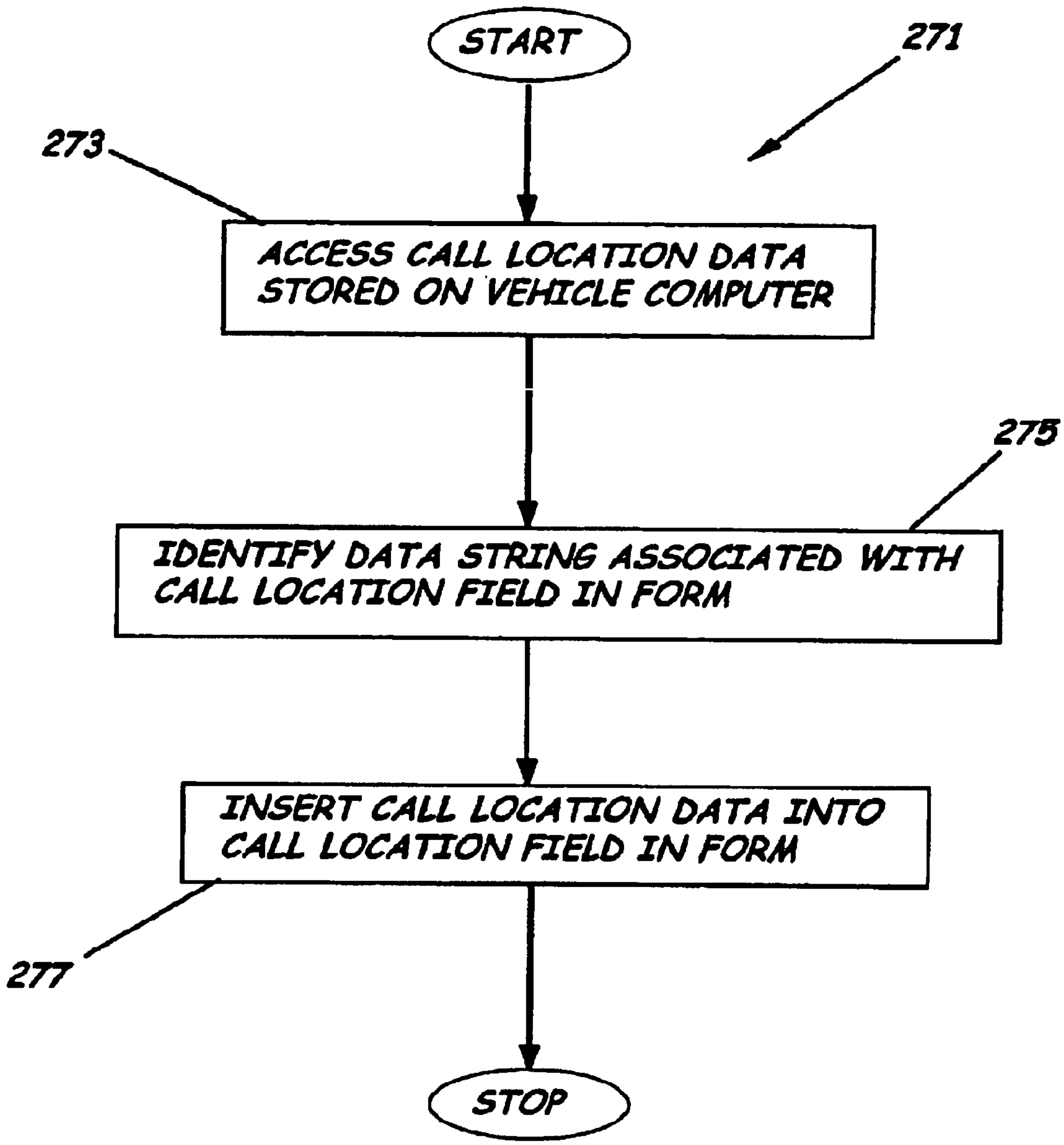
FIG. 23 is a schematic flow diagram showing how the form completing enhancer of officer communications enhancing software of an apparatus for communicating with law enforcement during vehicle travel populates call location data in the accident form according to the present invention.
Figure 24:
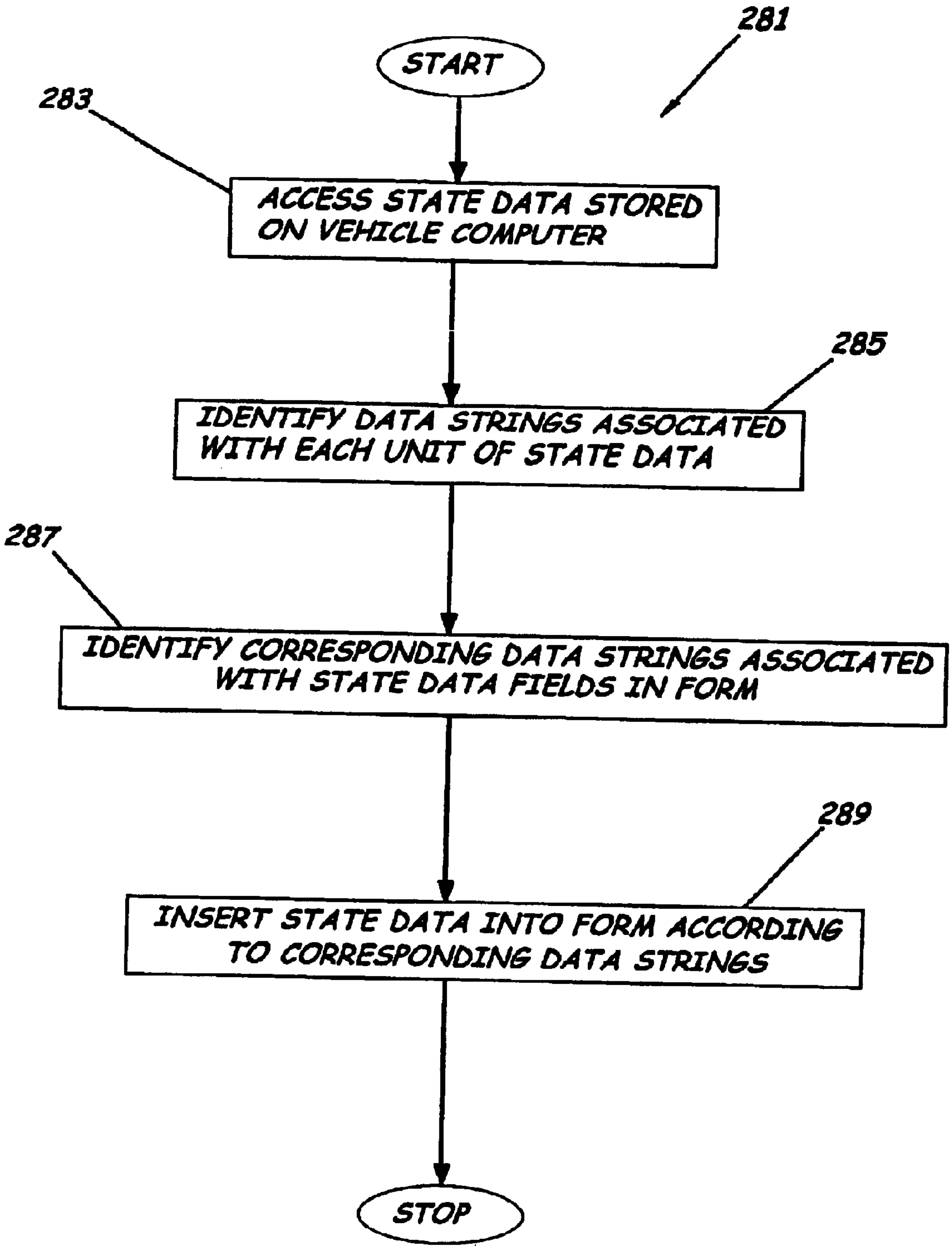
FIG. 24 is a schematic flow diagram showing how a form completing enhancer of officer communications enhancing software of an apparatus for communicating with law enforcement during vehicle travel populates state data in an accident form according to the present invention.

As shown in FIG. 20, the citation form completing enhancer 90 then loads the citation form initially selected by the officer O (block 241). As shown in FIG. 21, after the citation form is loaded, the citation form completing enhancer 90 then preferably accesses a database of officer data preferably stored on the vehicle computer 40 having officer identifying data required by the form (block 251). The citation form completing enhancer 90 then preferably identifies data strings associated with individual units of officer data, identifies data strings associated with officer data fields 101 in the form (block 253), and fills in the data fields 101 in the form according to the corresponding data strings (block 259). As shown in FIG. 22, after the officer data fields 101 in the form are populated, the citation form completing enhancer 90 accesses the case number previously obtained by the mobile data communications software 58, if any, and fills in the case number data field 101 in the form with the case number (block 261). As shown in FIG. 24, the citation form completing enhancer 90 then accesses the citation recipient data previously captured from the mobile data communications software 58 (block 281 and 283), compares the data strings associated with the data to the data strings associated with the data fields 101 in the form and populates the citation recipient data fields 101 in the form according to the corresponding data strings numbers.

Figure 5:
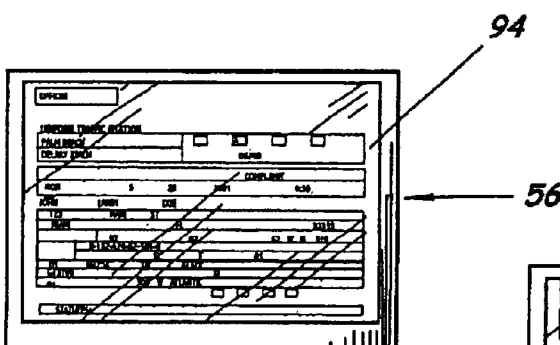
FIG. 5 is a front plan view of an officer display of a vehicle computer showing a populated citation form before a statute display menu is activated according to the present invention.
Figure 6:
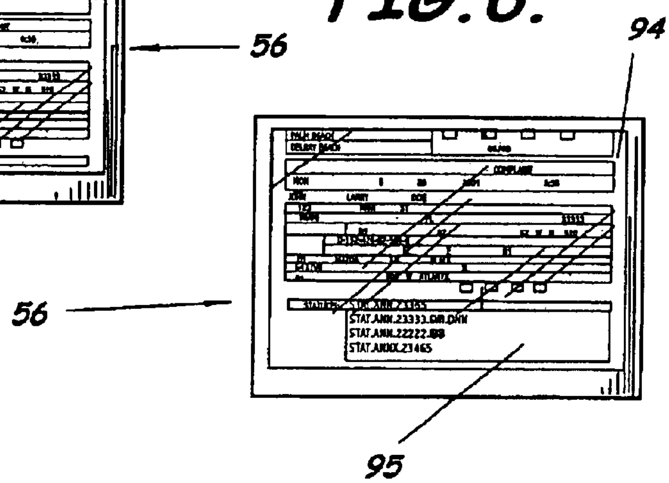
FIG. 6 is a front plan view of an officer display of a vehicle computer showing a citation form with a statute display menu activated according to the present invention.

As perhaps best shown in FIGS. 5 and 6, after the case number, officer data, and citation recipient data have been populated, the officer O preferably selects an offense from a list of offenses provided by the statute display menu 95 (block 291). FIG. 5 shows the form display GUI 94 before the statute display menu 95 is activated. The statute display menu 95 can be a drop down list or menu on the form display GUI 94 from which the officer O selects the appropriate offense as shown in FIG. 6. Responsive to the officer's selection of an offense, standard data specific to the offense such as the fee for the violation, citation to the statute violated, the court date to contest the ticket, or other data is then pulled from a database preferably located on the vehicle computer 40 and used to populate the form.

The data fields 101 completed up to this point are the prepopulated data fields 105. Any remaining data fields 101 which need to be completed after the prepopulated fields have been filled are officer populated data fields 107. After all the prepopulated data fields 105 have been populated, the officer O then preferably reviews the prepopulated data fields 105 in the accident report 98 and makes any necessary changes (block 301, block 303). The officer O also completes or fills any officer populated data fields 107. As mentioned above, the fields 101 which are filled or completed on the computer form correspond to blanks on the paper citation form. After all the data has been entered, most of which has preferably been populated by the citation form completing enhancer 90 in order to save time and eliminate unnecessary data entry, the citation form on the computer 40 is then preferably printed out with duplicate copies on the high impact printer 45 positioned in the law enforcement vehicle (block 305 and 307). The officer O can also transmit the form to the department server 35 (block 313 and 315) or save the form to the vehicle computer 40 (block 319 and 321).

The form completing enhancer can also be used for accident forms. For purposes of example and illustration and with reference to FIGS. 17A and 17B, the officer O initially calls up the accident form completing enhancer 90 on the vehicle computer 40 preferably by using a shortcut key (block 201). The officer O then preferably chooses the type of accident form to be used. For example, a longer form can be selected if the accident involves injuries and a shorter form can be selected if the accident does not involve injuries. The officer O is then preferably presented with the choice to use a case number in the accident report 98 or to issue an accident report 98 without a case number (block 203). If the officer O chooses to include a case number, the accident form completing enhancer 90 then preferably obtains a case number using substantially the steps followed by the citation form completing enhancer 90 to obtain a case number (block 205, 207 and 209). In the alternative, however, the case number can be determined by the officer O without communicating with the department server 35 such as by using a case number from a pre-printed form.

Figure 8:
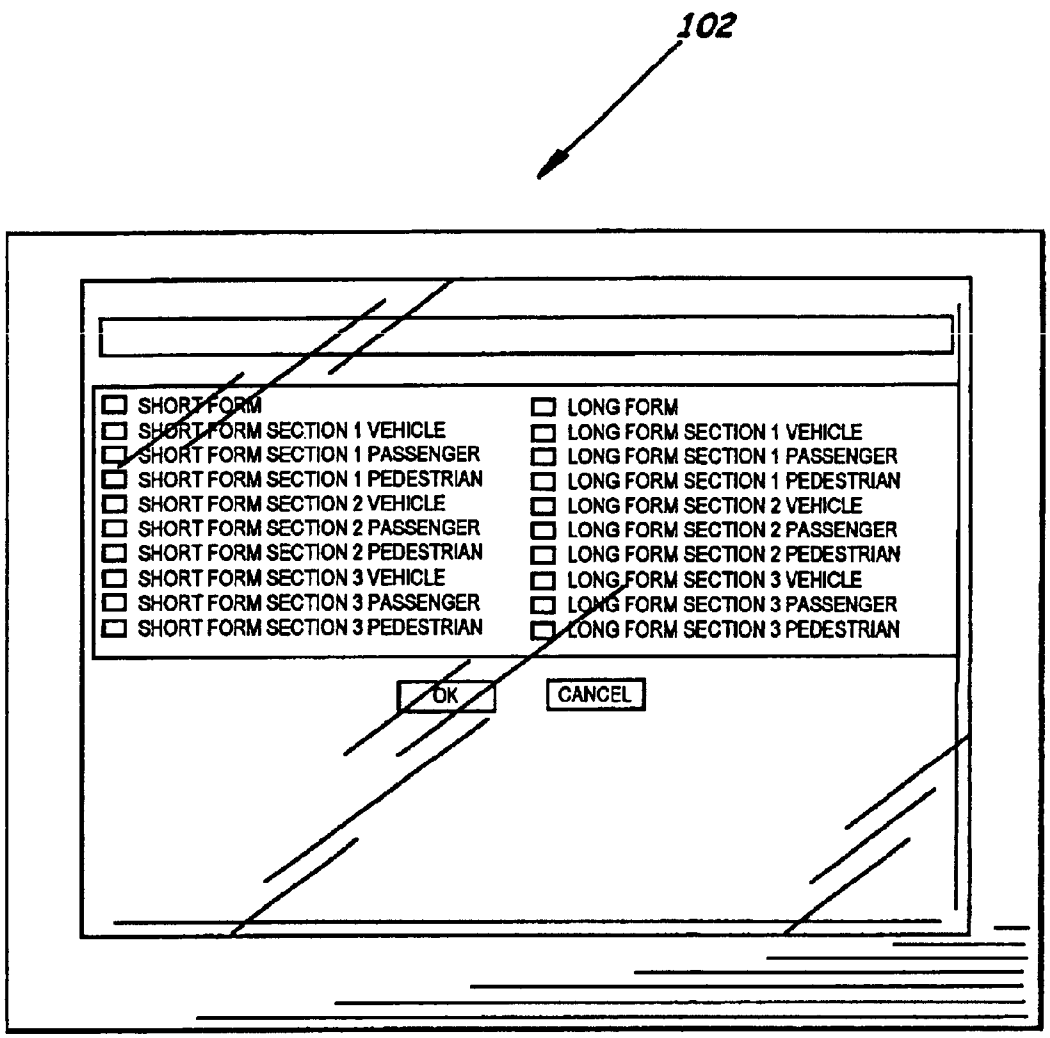
FIG. 8 is a front plan view of a form portion selection GUI according to the present invention.
Figure 19:
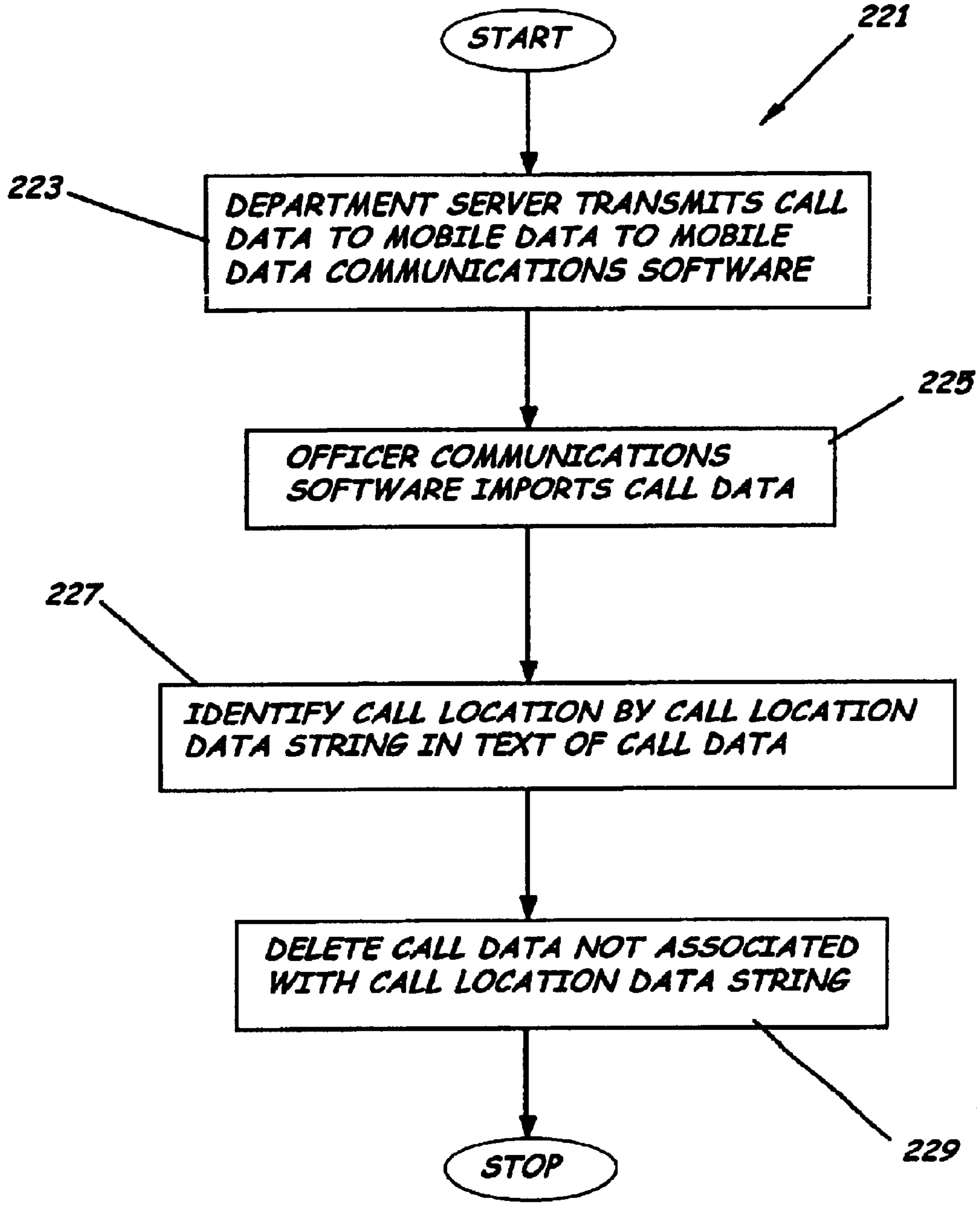
FIG. 19 is a schematic flow diagram showing how a form completing enhancer of officer communications enhancing software of an apparatus for communicating with law enforcement during vehicle travel captures call location data according to the present invention.

As perhaps best shown in the accident form portion selection screen 102 of the form display GUI of FIG. 8, after choosing whether to have a case number and selecting the type of form, the officer O preferably selects a form portion 103 of the accident report 98. The section preferably corresponds to a single vehicle or an individual involved in the accident. After selecting the form portion 103 of the accident report 98, the officer O then uses the mobile data communications software 58 to transmit a request for data related to the vehicle or individual. The department server 35 preferably locates the data using the same steps described above for locating data for the audio communicator 70. As shown in FIG. 18, the data is then transmitted back to the mobile data communications software 58 on the vehicle computer 40 (block 213) and is imported by the accident form completing enhancer 90 (block 215). The accident form completing enhancer 90 searches the data for data strings associated with required data preferably in much the same way as the audio communicator 70 searches for predetermined transmission data (block 217). After the data associated with the data strings is located, the data not associated with predetermined data strings are deleted (block 219). The remaining data is then preferably stored on the vehicle computer 40 for later retrieval, such as by being held in random access memory. As shown in FIG. 19, the call location data has preferably previously been imported from the mobile data communications software 58 by the quick mapper 110 as described in more detail below and is preferably being held in random access memory. The accident form completing enhancer 90 then preferably captures the case number, if any, from the mobile data communications software 58 (block 231).

As shown in FIG. 20, the accident form completing enhancer 90 then loads the accident form initially selected by the officer O (block 241). As shown in FIG. 21, after the accident form is loaded, the accident form completing enhancer 90 then preferably accesses a database of officer data preferably stored on the vehicle computer 40 having officer identifying data required by the form (block 255). The accident form completing enhancer 90 then preferably identifies data strings associated with individual units of officer data, identifies data strings associated with officer data fields 101 in the form (block 253), and fills in the data fields 101 in the form according to the corresponding data strings. As shown in FIG. 22, after the officer data fields 101 in the form are populated, the accident form completing enhancer 90 accesses the case number previously obtained by the mobile data communications software 58, if any, and fills in the case number data field 101 in the form with the case number (block 261). Following the case number, the accident report completing enhancer 90 then preferably accesses the accident location data and inserts it into the proper data field 101 in the form. The accident form completing enhancer 90 then accesses the data associated with the individual or vehicle involved in the accident previously captured from the mobile data communications software 58, compares the data strings associated with the data to the data strings associated with the data fields 101 in the form and populates the accident recipient data fields 101 in the form according to the corresponding data strings numbers.

After the case number, officer data, and accident recipient data have been populated, the officer O preferably uses the form portion selection screen 102 shown in FIG. 8 to select a new form portion 103 of the accident report 98 corresponding to further vehicles or individuals involved in the accident, if any. The number of form portions 103 that are completed in the accident report 98 preferably corresponds to the number of vehicle and individuals involved in the accident making it likely that not all form portions 103 will be completed. The officer O then uses the mobile data communications software 58 to request data from the department server 35 regarding these further individuals or vehicles. The response is then captured by the accident form completing enhancer 90 (block 211) and populated preferably in the same way as the first individual or vehicle data was populated (block 281).

As perhaps best shown in FIGS. 7 and 7A, the data fields 101 completed up to this point are the prepopulated data fields 105. Any remaining data fields 101 which need to be completed after the prepopulated fields have been filled are officer populated data fields 107. After all the prepopulated data fields 105 have been populated, the officer O then preferably reviews the prepopulated data fields 105 in the accident report 98 and makes any necessary changes (block 301, block 303). The officer O also completes or fills any officer populated data fields 107. As mentioned above, the data fields 101 which are filled or completed on the computer form correspond to blanks on the paper accident form. After all the data has been entered, most of which has preferably been populated by the accident form completing enhancer 90 in order to save time and eliminate unnecessary data entry, the form on the computer 40 is then preferably printed out on the non-high impact printer 47 positioned in the law enforcement vehicle V. The officer O can also transmit the form to the department server 35 (block 313, block 315) or save the form to the vehicle computer 40 (block 319, block 321).

As further shown in FIG. 13, the quick mapper 110 is responsive to officer call dispatch data including an incident location received from the mobile data communications software 58 to quickly generate and display a top plan street view map 117 of the incident location. The quick mapper 110 preferably includes a map database 112 having mapping data stored therein. The mapping data in the map database 112 is preferably provided by a third party mapping program such as the Streets and Trips program provided by the Microsoft Corporation of Seattle, Wash. but can also be mapping data provided by others. The quick mapper 110 preferably further includes a map applicator 114 in communication with the map database 112 to generate a map responsive to the incident location data. The map applicator 114 is also preferably provided by the third party mapping program. The quick mapper 110 even further includes a map applicator initiator 116 in communication with the map application and the mobile data communications software 58 to receive the officer call dispatch data and to communicate the incident location to the map applicator 114 to thereby generate a top plan street view map 117 of the incident location. The quick mapper 110 preferably generates a map when the vehicle computer 40 identifies an incident location from an incoming dispatch request. The center of the map is preferably the location of the incident with the map having a predetermined scale. The map of the incident area may be displayed immediately or can be held in memory 53 so that preferably a single command entry causes the map to be displayed.

Figure 25:
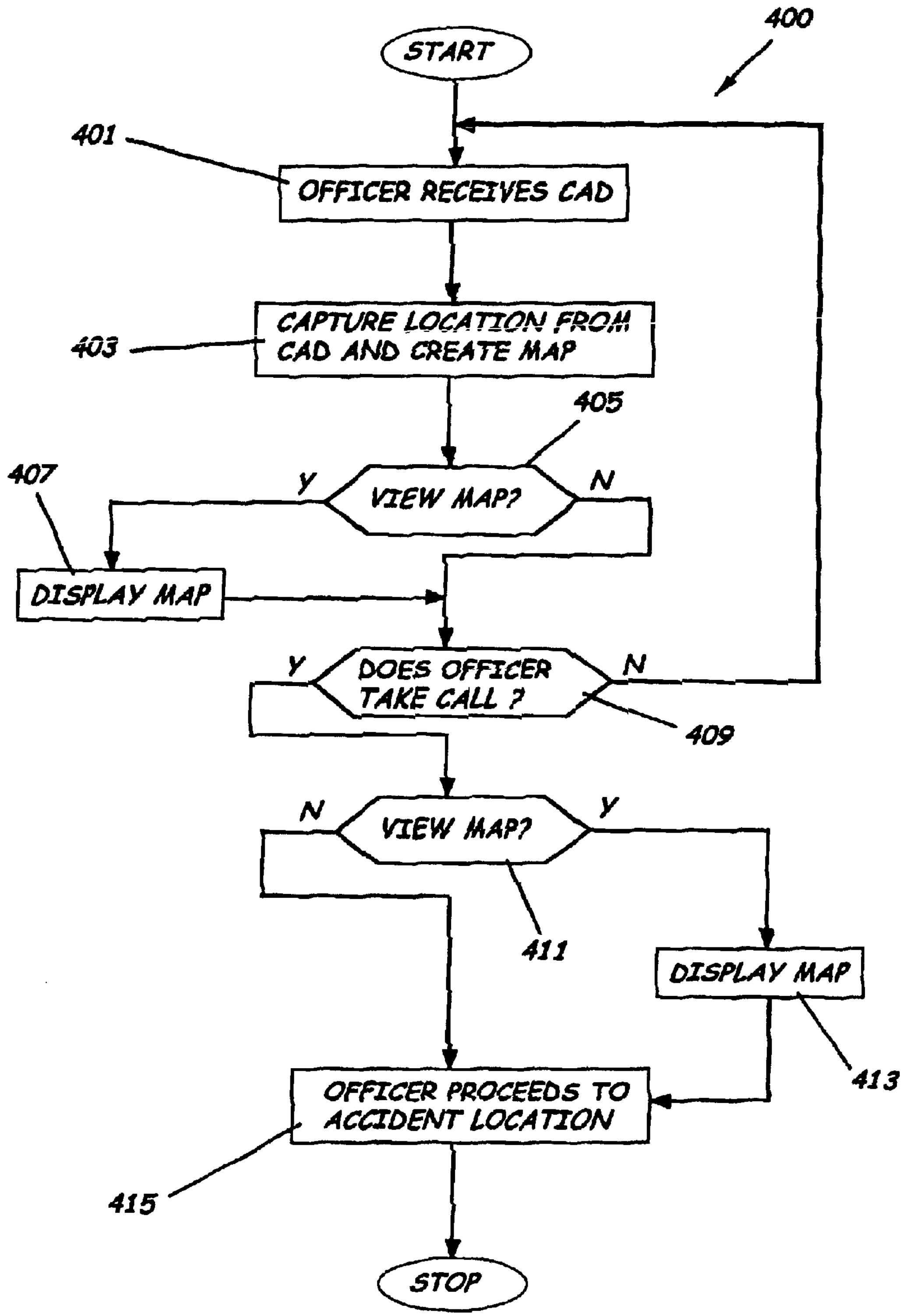
FIG. 25 is a schematic flow diagram showing how a quick mapper of officer communications enhancing software of an apparatus for communicating with law enforcement during vehicle travel generates a map of an incident location responsive to an incident location in officer call dispatch data received from the department server according to the present invention.

An example of how the quick mapper 110 can be used in a typical officer O response to an accident call will now be described. As shown in FIG. 25, computer aided dispatch ("CAD") data regarding an accident is transmitted preferably via radio frequency from the department server 35 to the vehicle computer 40 (block 401). The quick mapper 110 captures the location of the accident from the incoming transmission (block 403) and prepares a map of the accident area which is preferably of a predetermined size having the accident location at the center of the map. The officer O can be required to take the call or, in the alternative, can choose whether to take the call or not. If the officer O has the option to choose whether to take the call or not, the officer O can choose to view the map first to determine whether the accident location is close enough for the officer O to accept the call (block 405). Either automatically or in response to a key pressed by the officer O, the officer display 56 shows a map of the accident area to assist the officer O (block 407). The officer O may also decide to take the call (block 409) and only view the map after the call has been accepted (block 411, block 413). If the officer O accepts the call, the officer O then uses the map to proceed to the accident location (block 415).

As shown in FIGS. 1–25 and as described above, the present invention further advantageously includes a method of enhancing communication with a law enforcement officer O positioned in a law enforcement vehicle V. The method preferably includes detecting law enforcement data received from a law enforcement database 38 in communication with the law enforcement vehicle V, parsing the detected law enforcement data for preselected data fields 101, and audio announcing preselected and prerecorded audio messages responsive to data within the preselected data fields 101. The method can further include indicating levels of law violation and transmitting an audio alarm to the officer O corresponding to the level of indicated law violation. This addition to the method can be particularly advantageous for rapidly informing the officer O of the presence of dangerous individuals allowing the officer O to take precautionary measures.

The present invention further provides a method of enhancing communication with a law enforcement officer O positioned in a law enforcement vehicle V. The method preferably includes detecting law enforcement data received from a law enforcement database 38 in communication with the law enforcement vehicle V, parsing the detected law enforcement data for preselected data fields 101, and populating preselected data fields 101 in a incident form on the vehicle computer 40 with the preselected data. The preselected data can be identified by a data string such as a text string preceding the preselected data or by some data strings associated with the data. The method can further include populating a plurality of preselected data fields 101 in an incident form with data stored on the vehicle computer 40 responsive to the officer O populating a single data field 101. Officer's O often encounter the same type of incident repeatedly requiring them to enter the same data and check the same boxes on the incident form each time they encounter the incident. This addition to the method allows the officer O to identify the pattern, after which the pattern is completed using data from the vehicle computer 40. The method can further include printing the incident form using a high impact printer 45 located in the law enforcement vehicle V and in communication with the vehicle computer 40.

The present invention also further provides a method of enhancing communication with a law enforcement officer O positioned in a law enforcement vehicle V. The law enforcement vehicle V preferably has a vehicle computer 40 positioned therein and in communication with a department server 35. The method preferably includes detecting incident location data received in a dispatch transmission to the vehicle computer 40 from the department server 35, generating a map of an incident location responsive to the incident location data, and displaying the map responsive to an officer O request for map data. The map data can be a top plan street view map 117 of the incident location. The method can still further include importing the incident location data into a preexisting map database 112 and then displaying a map from the map database 112. The map database 112 used in this step of the method can be a third party map database such as the Microsoft Streets and Trips program available from the Microsoft Corporation of Seattle, Wash.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That claimed is:

1. Officer communications enhancing software stored on a vehicle computer having an officer display connected thereto and in communication with mobile data communications software stored on the vehicle computer to enhance officer communication with the department server through the vehicle computer, the officer communications enhancing software comprising:

a form completing enhancer to generate and populate a plurality of preselected incident forms on an officer display attached to the vehicle computer, the form completing enhancer including at least one form database including a plurality of preselected incident forms, a form display graphical user interface in communication with the form database to graphically display one of the preselected incident forms to the officer, and a form enhancing populator in communication with the mobile data communications software to receive the law enforcement data therefrom.

2. Software as defined in claim 1, wherein each of the plurality of preselected incident forms of the form database includes a plurality of incident form data fields including prepopulated data fields and officer interface populated data fields, the number of the plurality of the prepopulated data fields being substantially larger than the number of officer populated data fields, the prepopulated data fields including vehicle incident data fields and vehicle officer data fields, and wherein the form enhancing populator only populates the prepopulated data fields of each of the plurality of preselected incident forms.

3. Software as defined in claim 2, wherein the vehicle computer further is in communication with a high impact printer, and wherein the vehicle computer is in communication with print data from the plurality of data fields to a preselected incident form having data field locations substantially corresponding to the plurality of data fields being displayed to the officer by the graphical user interface, the preselected incident form being a separate form having a plurality of form layers, the plurality of form layers including a first form layer having a first form data field layout and a second form layer underlying the first form layer and having a second data field form layout, the second data field form layout being substantially the same as the first form layer data field layout so that when the separate form is fed through the printer the high impact printer prints data.

4. Software as defined in claim 3, wherein the plurality of vehicle incident data forms includes at least one citation form, at least one accident form, at least one towing form, and at least one warning form.

5. Software as defined in claim 4, wherein the officer populated data fields include a plurality of statute citation data fields and wherein the graphical user interface further includes a statute display menu having a plurality of preselected statute violations responsive to the officer to display to the officer to thereby allow the officer to select one of the plurality of preselected statute violations to be readily prepopulated into the plurality of statute citation data fields.

6. Software as defined in claim 5, wherein the at least one accident form includes a plurality of form portions, a first form portion of the plurality of form portions being required to be completed and other form portions of the plurality of form portions being optionally completed, each of the plurality of form portions having a separate plurality of accident data fields including a plurality of prepopulated data fields and a plurality of officer populated data fields.

7. Software as defined in claim 6, wherein the officer communication enhancing software further includes a quick mapper responsive to officer call dispatch data including an incident location received from the mobile data communications software to quickly generate and display a top plan street view map of the incident location.

8. Software as defined in claim 7, wherein the quick mapper includes a map database having a plurality of maps stored therein, a map applicator in communication with the map database to generate a map responsive to the incident location data, an a map applicator initiator in communication with the map applicator and the mobile data communications software to receive the officer call dispatch data and to communicate the incident location to the map applicator to thereby generate the top plan street view map of the incident location.

9. Software as defined in claim 8, further including officer communications enhancing software stored on the vehicle computer and in communication with mobile data communications software to enhance officer communication with the department server through the vehicle computer in communication with at least one audio speaker, the officer communications enhancing software including an audio communicator positioned to transmit enhanced audio law enforcement data received from the mobile data communications software to the officer through the at least one audio speaker, the enhanced audio law enforcement data including a plurality of preselected and prerecorded audio messages responsive to the law enforcement data received from the mobile data communications software.

10. Officer communications enhancing software stored on a vehicle computer having an officer display connected thereto and in communication with mobile data communications software stored on the vehicle computer to enhance officer communication with a law enforcement department server through the vehicle computer, the office communications enhancing software comprising:

a quick mapper responsive to officer call dispatch—data including incident location received from the mobile data communications software to quickly generate and display a top plan street view map of the incident location, the quick mapper including a map database having a plurality of maps stored therein, a map applicator in communication with the map database to generate a map responsive to the incident location data, and a map applicator initiator in communication with the map applicator and the mobile data communications software to receive the officer call dispatch data and to communicate the incident location to the map applicator to thereby generate the top plan street view map of the incident location; and the vehicle computer further being positioned in communication with at least one audio speaker, and the officer communications enhancing software further comprising an audio communicator positioned to transmit enhanced audio law enforcement data received from the mobile data communications software to the officer through the at least one audio speaker, the enhanced audio law enforcement data including a plurality of preselected and prerecorded audio messages responsive to the law enforcement data received from the mobile data communications software.

11. Software as defined in claim 10, wherein the vehicle computer is further positioned in communication with at least one audio speaker, and the officer communications enhancing software further comprising an audio communicator positioned to transmit enhanced audio law enforcement data received from the mobile data communications software to the officer through the at least one audio speaker 43, the enhanced audio law enforcement data including a plurality of preselected and prerecorded audio messages responsive to the law enforcement data received from the mobile data communications software.

12. A method of enhancing communication with a law enforcement officer positioned in a law enforcement vehicle, the method comprising:

detecting law enforcement data received from a law enforcement database in communication with the vehicle;

parsing the detected law enforcement data for preselected data fields; and populating preselected data fields in a incident form on the vehicle computer with the preselected data.

13. The method as described in claim 12, further comprising populating a plurality of preselected data fields in an incident form with data stored on the vehicle computer responsive to the officer populating a single data field.

14. The method as described in claim 13, further comprising printing the incident form using a high impact printer located in the vehicle and in communication with the vehicle computer.

15. A method of enhancing communication with a law enforcement officer positioned in a law enforcement vehicle, the vehicle having a vehicle computer positioned therein and in communication with a department server, the method comprising:

detecting incident location data received in a dispatch transmission to the vehicle computer from the department server;

generating a map of an incident location 10 responsive to the incident location data; and displaying the map responsive to an officer request for map data.

16. A method as described in claim 15, wherein the map of the incident location is a top plan street view map.

17. A method as described in claim 15, further comprising importing the incident location data into a preexisting map database and then displaying a map from the map database.

* * * * *